(12) United States Patent
Takato

(10) Patent No.: US 6,519,095 B1
(45) Date of Patent: Feb. 11, 2003

(54) ZOOM LENS

(75) Inventor: Hideyasu Takato, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 26 days.

(21) Appl. No.: 09/672,834

(22) Filed: Sep. 29, 2000

(30) Foreign Application Priority Data

Jan. 25, 2000 (JP) ........................................ 2000-015271
Jun. 16, 2000 (JP) ........................................ 2000-181014

(51) Int. Cl.⁷ .............................................. G02B 15/14
(52) U.S. Cl. ........................................ 359/689; 359/683
(58) Field of Search ................................ 359/686, 683, 359/676, 689

(56) References Cited

U.S. PATENT DOCUMENTS 5,726,810 A * 3/1998 Meyers .................... 359/684
6,327,100 B1 * 12/2001 Yamanashi ................ 359/689

FOREIGN PATENT DOCUMENTS

| JP | 8-152559 | 6/1996 |
| JP | 10-268191 | 10/1998 |
| JP | 11-52243 | 2/1999 |
| JP | 11-119098 | 4/1999 |

* cited by examiner

Primary Examiner—Jordan M. Schwartz
(74) Attorney, Agent, or Firm—Pillsbury Winthrop LLP

(57) ABSTRACT

The invention provides a very compact zoom lens system having a high zoom ratio with improved performance, which comprises, comprising, in order from an object side of the system, a positive, first lens group G1, a positive, second lens group G2 and a negative, third lens group G3, wherein while each lens group moves from an image side of the system to the object side for zooming from a wide-angle end to a telephoto end of the system, the following condition (1) is satisfied:

$$L_T/f_T < 0.75 \quad (1)$$

Here $L_T$ is the distance at the telephoto end from a front surface of the zoom lens system to an image formation position and $f_T$ is the focal length of the zoom lens system at the telephoto end.

3 Claims, 16 Drawing Sheets

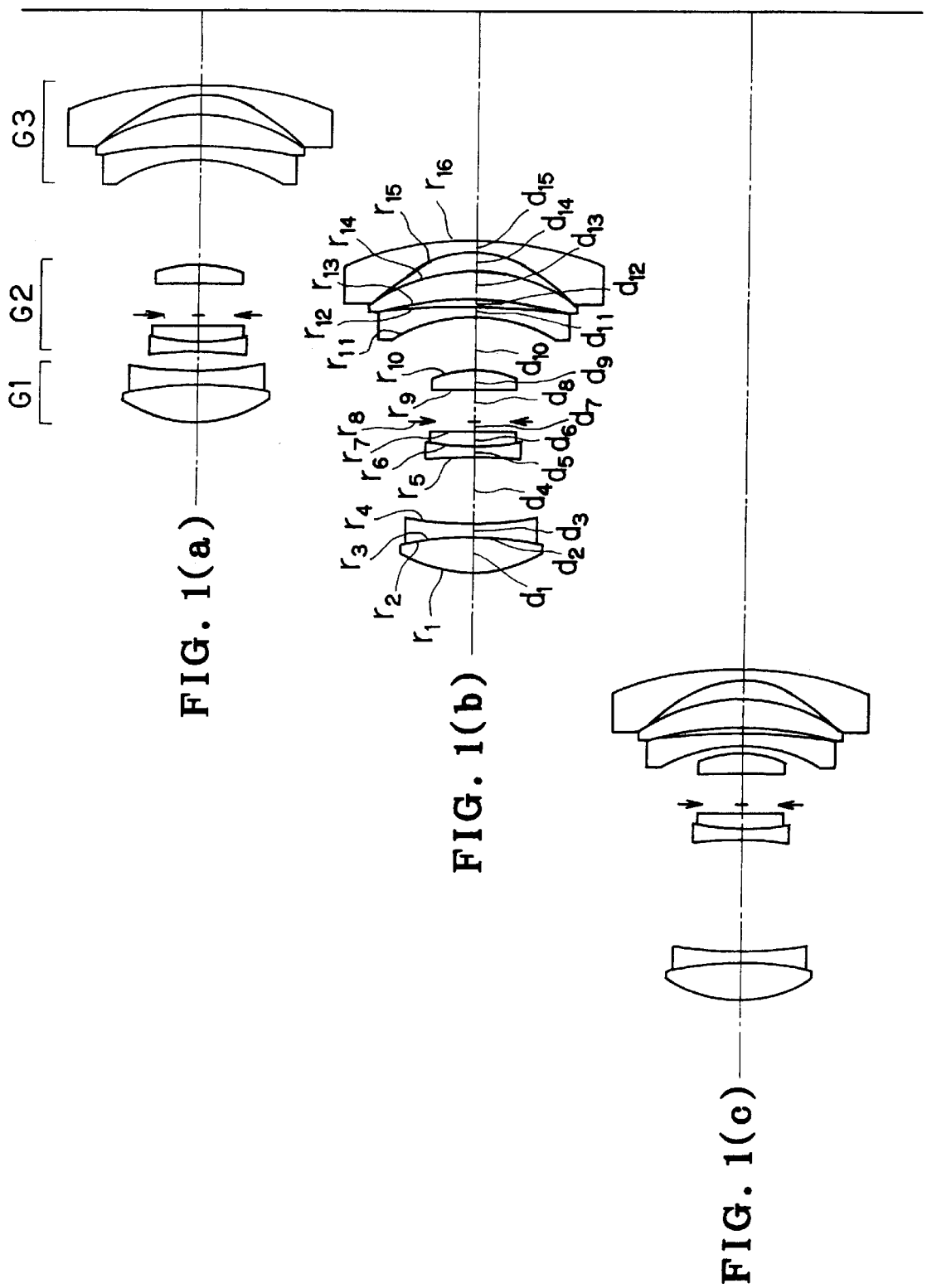

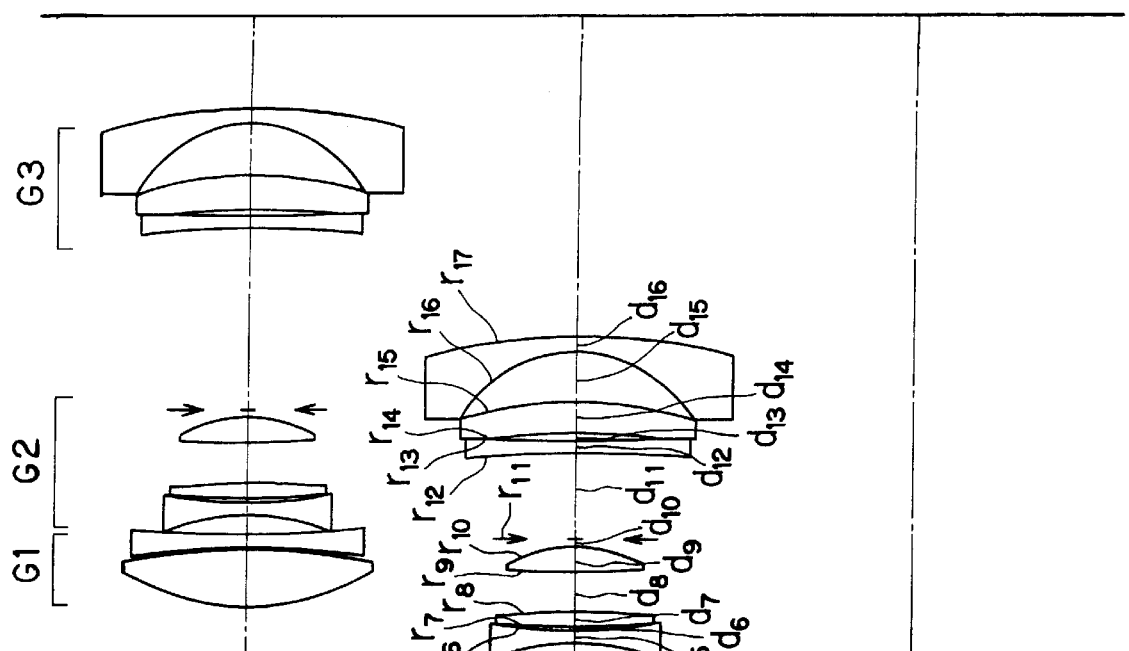
FIG. 6(a)
FIG. 6(b)
FIG. 6(c)

ZOOM LENS

This application claims benefit of Japanese Application(s) No. 2000-15271 filed in Japan on Jan. 25, 2000 and No. 2000-181014 filed in Japan on Jun. 16, 2000, the contents of which are incorporated by this reference.

BACKGROUND OF THE INVENTION

The present invention relates generally to a zoom lens, and more particularly a zoom lens system designed for use on compact cameras.

Among compact camera-oriented zoom lenses well known in the art, there are a two-group zoom lens designed to vary its focal length by varying the separation between a positive group and a negative group and a three-group zoom lens designed to vary its focal length by varying separations between three groups, positive, positive and negative.

Of these zoom lenses, the two-group zoom lens can be more simplified in lens mount structure and driving mechanism, and more reduced in the number of lenses, than the three-group zoom lens, and so is favorable for achieving cost reductions. On the other hand, the three-group zoom lens has a high zoom ratio and is excellent in overall size reductions.

Compact zoom lens systems having relatively high zoom ratios are disclosed in JP-A's 8-152559, 10-268191, 11-52243 and 11-119098.

With the zoom lenses set forth in these publications, it is possible to achieve some size reductions as can be seen from the telephoto ratio of about 0.08. However, all of them have a zoom ratio of 3 or greater and a focal length of 130 mm or greater on the telephoto side, and so still need a large camera lens mount even when the telephoto ratio is reduced down to 0.08. Thus, these zoom lenses fail to reduce the size of associated cameras. Usually, the higher the zoom ratio, the larger the size Of an associated camera is. For this reason, cameras having a zoom ratio of 3 or greater is vastly inferior in compactness to 2× class cameras; that is, users who attach importance to compactness must wink at specifications to some degrees.

To achieve further size reductions by increasing zoom ratios, it is generally preferable to increase the curvature and, hence, refracting power of each lens surface. In this case, however, large aberrations are produced at each lens surface and aberration fluctuations during zooming become large. To obtain a sufficient zoom ratio and reduce the aberration fluctuations during zooming, thereby achieving satisfactory performance throughout zooming zones, it is required to increase the number of lenses and, optionally, make heavy use of aspherical surfaces. This results not only in an increase in the size of the lens system but also in cost increases.

When the aberration fluctuations during zooming are reduced by decreasing the refracting power of each lens, the amount of zooming movement of each group becomes too large to make the lens system compact.

SUMMARY OF THE INVENTION

In view of such problems with the prior art as mentioned above, an object of the present invention is to provide a very compact zoom lens system which has a high zoom ratio and improved performance.

According to the first aspect of the present invention, there is provided a zoom lens system comprising, in order from an object side of the system, a positive, first lens group, a positive, second lens group and a negative, third lens group, characterized in that while each lens group moves from an image side of the system to the object side for zooming from a wide-angle end to a telephoto end of the system, the following condition (1) is satisfied:

$$L_T/f_T<0.75 \quad (1)$$

Here $L_T$ is the distance at the telephoto end from the front surface of the zoom lens system to an image formation position and $f_T$ is the focal length of the zoom lens system at the telephoto end.

It is here noted that by the front surface of the zoom lens system is intended the object-side surface of the zoom lens system located nearest to the object side of the zoom lens system and by the image formation position is intended a position where an object image is formed by the zoom lens system and a film plane or an image pickup device such as a CCD is located.

According to the second aspect of the present invention, there is provided a zoom lens system comprising, in order from an object side of the system, a positive, first lens group, a negative, second lens group, a positive, third lens group and a negative, fourth lens group, characterized in that while each lens group moves from an image side of the system to the object side for zooming from a wide-angle end to a telephoto end of the system, the following condition (1') is satisfied:

$$L_T/f_T<0.65 \quad (1')$$

Here $L_T$ is the distance at the telephoto end from the front surface of the zoom lens system to an image formation position and $f_T$ is the focal length of the zoom lens system at the telephoto end.

According to the third aspect of the present invention, there is provided a zoom lens system comprising, in order from an object side of the system, a positive, first lens group, a positive, second lens group and a negative, third lens group, characterized in that while each lens group moves from an image side of the system to the object side for zooming from a wide-angle end to a telephoto end of the system, the first lens group comprises, in order from an object side thereof, a positive lens and a negative lens, and satisfies the following condition (2):

$$0.2<f_1/f_T<0.5 \quad (2)$$

Here $f_1$ is the focal length df the first lens group and $f_T$ is the focal length of the zoom lens system at the telephoto end.

According to the fourth aspect of the present invention, there is provided a zoom lens system comprising, in order from an object side of the system, a positive, first lens group, a positive, second lens group and a negative, third lens group, characterized in that while each lens group moves from an image side of the system to the object side for zooming from a wide-angle end to a telephoto end of the system, the second lens group comprises, in order from an object side thereof, a cemented lens consisting of a negative lens and a positive lens and a positive lens and the following condition (3) is satisfied:

$$f_T/f_W>3 \quad (3)$$

Here $f_T$ is the focal length of the zoom lens system at the telephoto end, and $f_W$ is the focal length of the zoom lens system at the wide-angle end.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 1(a), 1(b) and 1(c) are sectional schematics of the lens arrangement of Example 1 of the zoom lens system according to the present invention at its wide-angle end (a), its intermediate settings (b) and its telephoto end(c), respectively.

FIGS. 6(a), 6(b) and 6(c) are sectional schematics of the lens arrangement of Example 6 of the zoom lens system according to the present invention at its wide-angle end (a), its intermediate settings (b) and its telephoto end(c), respectively.

DESCRIPTION OF THE PREFERRED EMBODIMENTS

Figures 2A, 2B, 2C:
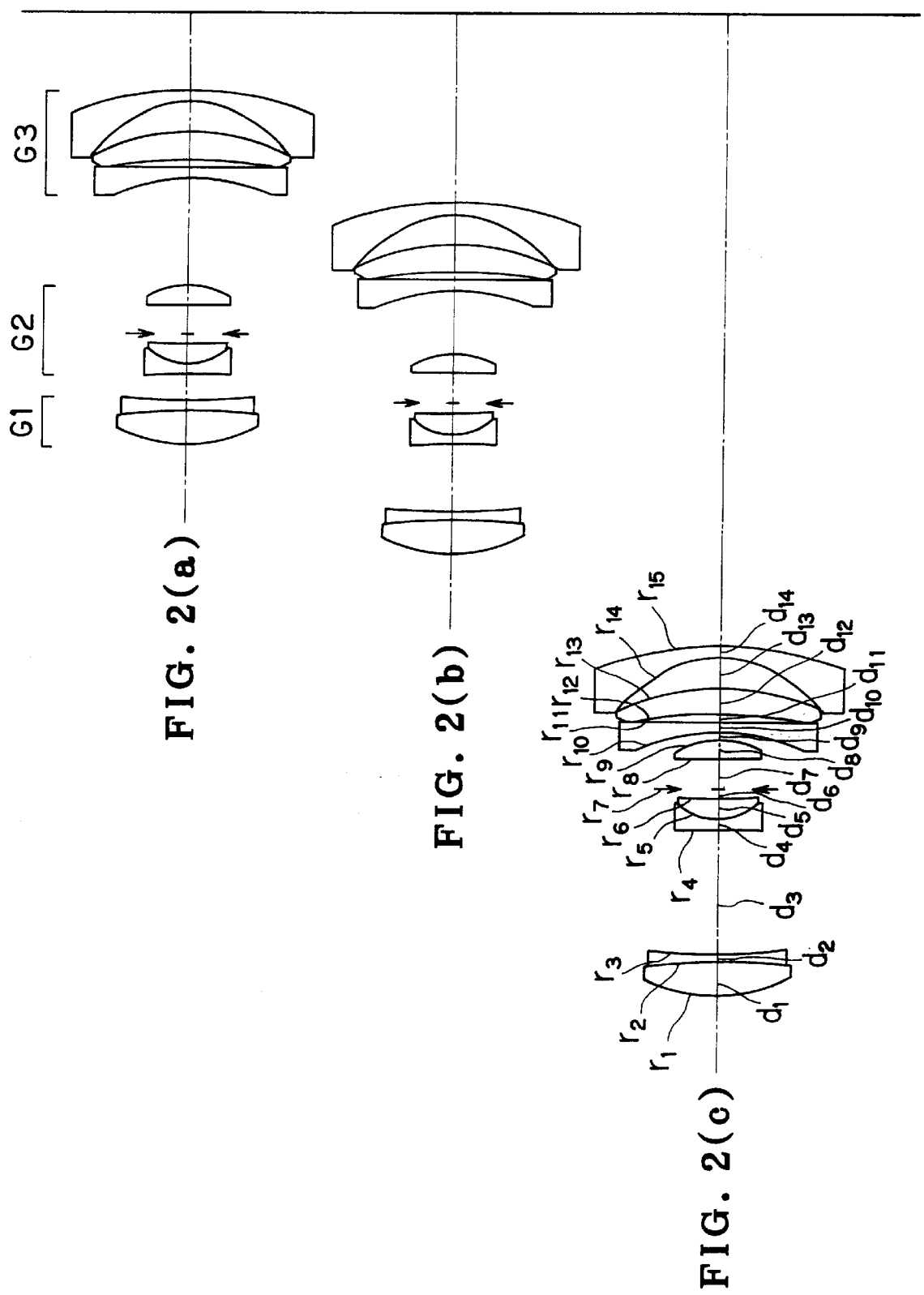
FIGS. 2(a), 2(b) and 2(c) are sectional schematics of the lens arrangement of Example 2 of the zoom lens system according to the present invention at its wide-angle end (a), its intermediate settings (b) and its telephoto end(c), respectively.

The advantages of, and requirements for, the present invention are now explained.

The zoom lens system according to the present invention comprises three or four lens groups and has a zoom ratio of about 4. In the case of three lens group-construction, the zoom lens system comprises, in order from the object side thereof, a positive, first lens group, a positive, second lens group and a negative, third lens group, and is characterized in that its telephoto ratio at the telephoto end is 0.75 or less, as defined by the following condition (1)

$$L_T/f_T<0.75 \tag{1}$$

By satisfying this condition, it is possible to make the lens system compact. It is thus possible to set up a lens mount for this 4× class zoom lens system, which mount is equivalent in size to that for the 3× class. Conversely, a lens system capable of meeting this condition is required for the purpose of achieving a compact camera having a zoom ratio of 3 to 4.

For a more compact camera, it is preferable to satisfy the following condition (1') where the upper limit of 0.75 in condition (1) is reduced down to 0.65:

$$L_T/f_T<0.65 \tag{1'}$$

By satisfying this condition, it is possible to set up a lens mount equivalent in size to that for the 2× to 3× class. It is also possible to reduce the size of a lens mount for a four-group type zoom lens system comprising, in order from its object side, a positive, first lens group, a negative, second lens group, a positive, third lens group and a negative, fourth lens group.

By conforming to condition (1), and preferably condition (1'), it is possible to achieve a camera equivalent in size to that having a low zoom ratio.

More preferably, the zoom lens system of the present invention should satisfy the following condition (1"):

$$0.4<L_T/f_T \tag{1"}$$

If $L_T/f_T$ is less than 0.4, the lens system becomes too small to make correction for aberrations, because the refracting power of each lens group increases extraordinarily.

Preferably, the zoom lens system of the present invention should an overall length of about 100 mm or less at its telephoto end. Given this length, it is possible to achieve a compact camera that is the object of the invention.

Preferably, the zoom lens system of the present invention should comprise less than 10 lenses. The size of a camera lens mount with lenses received therein is not absolutely larger than the total thickness of the lenses, and so the number of the lenses should preferably be reduced as much as possible. Even when the telephoto ratio of the lens system is so reduced that its overall length can become short during photographing, any increase in the size of the lens mount with the lenses received therein is not preferable, because compactness is foiled.

In the present invention, the lens system is composed of about 8 lenses so as to reduce the size of a lens mount with the lenses received therein, thereby downsizing an associated camera.

As already explained, the zoom lens system of the present invention may be of either the three-group type of ++− construction or the four-group type of +−+− construction. The merit of the three-group zoom type is that mechanical construction can be easily set up, and the merit of the four-group zoom type is that it has some degree of flexibility in lens design, and is much more favorable for downsizing.

To downsize the lens system, the refracting powers of the respective lens groups should be distributed according to a proper profile. In particular, the refracting power of the first lens group should satisfy the following condition (2):

$$0.2 < f_1/f_T < 0.5 \tag{2}$$

When the upper limit of 0.5 in this condition is exceeded, the refracting power of the first lens group becomes too weak to make the overall length of the system short. When the lower limit of 0.2 is not reached, that refracting power becomes tool strong to make satisfactory correction for various aberrations in general and spherical aberrations in particular on the telephoto side. In addition, the sensitivity of the first lens group to fabrication errors becomes too high for stable lens fabrication.

The first lens group should be of +− construction, as viewed in order from its object side. This construction is favorable for downsizing because it is easy to locate an entrance pupil on the front side of the lens system. Then, the first lens group may be made up of either two lenses or a positive lens and a negative lens, or a cemented lens. The two-lens construction is favorable for correction of aberrations because the degree of lens flexibility is maintained. The cemented lens construction is more easily achievable because of some considerable drop of the sensitivity of the first lens group to fabrication errors.

Much more size reductions are achievable by setting up the zoom lens in such a way as to satisfy the following condition (2'):

$$0.2 < f_1/f_T < 0.4 \tag{2'}$$

Preferably in this case, the lens system should be made up of four or +−+− lens groups, because a collapsing space of lens collapsing is easily available.

The second lens group should preferably comprise a −+ cemented lens and a positive lens. For a lens system comprising three or ++− lens groups it is preferable to satisfy the following condition (3):

$$f_T/f_W > 3 \tag{3}$$

However, the lens system having a zoom ratio high enough to meet condition (3) and a large focal length on the telephoto side produces considerable longitudinal chromatic aberration. To correct this, it is desired that the −+ cemented lens be disposed in the second lens group.

In addition, another positive lens should be located in the second lens group because the second lens group is required to have some positive refracting power for size reductions.

With correction of distortion in a wide-angle range in mind, it is preferable to locate a stop at the center of the zoom lens system, i.e., between the cemented lens and the positive lens in the second lens group. With this arrangement, it is further possible to reduce the diameters of the front and rear lenses in a well-balanced state.

By satisfying the following condition (6), it is further possible to make well-balanced correction for longitudinal chromatic aberration and chromatic aberration of magnification in particular.

$$0.05 < d/f_W < 0.15 \tag{6}$$

Here d is the distance between the second lens and the third lens in the second lens group.

If this condition is satisfied, it is possible to make substantial correction for chromatic aberrations. In other words, it is then unnecessary to construct the first and second lenses in a cemented form.

Preferably, aspherical lenses should be located before and after the stop so that spherical aberrations in a telephhoto range can be well corrected.

The final negative lens group should preferably be of −+− construction. If the refracting power of the final lens group is increased so as to downsize the lens system, the coma at this group becomes large in the wide-angle range. With the −+− construction, however, it is possible to reduce the coma produced at the final lens group as much as possible.

To use a meniscus lens concave on its object side as the positive lens in the final lens group is favorable for the downsizing of the lens system, because the principal point of this lens group can be located on the front side.

If an aspherical surface is introduced in this lens group, it is then possible to make more satisfactory correction for coma and distortion in the wide-angle range. The greatest effect on this correction is obtained at the positive lens or the final negative lens. In other words, if the aspherical surface is used at either one of such lenses, it is then possible to keep peripheral performance in good condition.

For such a three-group zoom lens as contemplated in the present invention, it is most desired in view of both optical performance and mechanical mechanism for focusing that focusing be carried out by the second lens group. Preferably in this case, the following condition (4) should be satisfied:

$$0.2 < |f_3|/f_2 < 0.6 \tag{4}$$

Here $f_3$ is the focal length of the third lens group and $f_2$ is the focal length of the second lens group.

When the upper limit of 0.6 in this condition is exceeded or when the refracting power of the second lens group becomes strong, the sensitivity of the lens system to errors becomes too high, resulting in a difficult-to-focus camera. When the lower limit of 0.2 in condition (4) is not reached, on the other hand, the refracting power of the second lens group becomes weak; that is, not only are image plane variations due to focusing large but it is also difficult to achieve size reductions.

By reducing the upper limit of 0.6 down to 0.5 as represented by condition (4'), the effect is more enhanced so that a more practical camera can be achieved.

$$0.2 < |f_3|/f_2 < 0.5 \tag{4'}$$

To make the zoom lens system of the present invention more compact, the following condition should preferably be satisfied:

$$L_T < 100 (\text{mm}) \tag{5}$$

$L_T$ is the distance at the telephoto end from the front surface of the zoom lens system to the image formation position, and $f_T$ is the focal length of the zoom lens system at the telephoto end.

The zoom lens system of, the present invention may be designed in such a way that for zooming, the first lens group and final lens group move together or each lens group moves independently. The former design for integral movement is favorable for cost and size reductions, and the latter design for independent movement makes it possible to achieve a zoom lens system of ever-higher performance because of an increase in the degree of design flexibility.

More preferably in the three-group zoom lens system, the following condition (7) should be satisfied:

$$0 < (D_{1W} + D_{2W})/(D_{1T} + D_{2T}) < 1 \tag{7}$$

Here $D_{1W}$ is the separation between the first and second lens groups at the wide-angle end, $D_{2W}$ is the separation between the second and third lens groups at the wide-angle end, $D_{1T}$ is the separation between the first and second lens groups at the telephoto end, and $D_{2T}$ is the separation between the second and third lens groups at the telephoto end.

When condition (7) is satisfied, the first and final (third) lens groups move away from each other for zooming from the wide-angle end to the telephoto end, with the amount of movement of the first lens group being larger than that of the final lens group. As a result, size reductions are achievable even when the refracting power of each lens group is decreased. If the refracting power of each lens group becomes weak, it is possible to achieve an easy-to-fabricate lens system because of a decrease in its sensitivity to fabrication errors.

It is here noted that when $(D_{1W}+D_{2W})/(D_{1T}+D_{2T})=1$, the first lens group moves together with the final lens group for zooming from the wide-angle end to the telephoto end, and when $(D_{1W}+D_{2W})/(D_{1T}+D_{2T})>1$, the first and final lens groups move close to each other for zooming from the wide-angle end to the telephoto end.

Examples 1 through 7 of the zoom lens system according to the present invention are now explained. Shown in FIGS. 1(a) to 1(c) through 7(a) to 7(c) are lens sections of Examples 1 through 7, as viewed at the wide-angle ends (a), intermediate settings (b) and telephoto ends (c). Numerical data on each example will be given later.

EXAMPLE 1

Example 1 is directed to a zoom lens system having a focal length of 39.3 to 151.8 mm and an F-number of 4.64 to 12.87. As shown in FIGS. 1(a) to 1(c), the zoom lens system consists of a first lens group G1 having positive refracting power, a second lens group G2 having positive refracting power and a third lens group G3 having negative refracting power. For zooming from the wide-angle end to the telephoto end of the system, the respective lens groups G1 to G3 move toward the object side of the system while the separation between the first lens group G1 and the second lens group G2 becomes wide and the separation between the second lens group G2 and the third lens group G3 becomes narrow. It is here noted that the first lens group G1 moves together with the third lens group G3.

The first lens group G1 consists of a double-convex lens and a double-concave lens, the second lens group G2 consists of a doublet made up of a double-concave lens and a double-convex lens, an aperture stop and a positive meniscus lens concave on its object side, and the third lens group G3 consists of a negative meniscus lens, a positive meniscus lens and a negative meniscus lens, all concave on their object sides. Three aspherical surfaces are used, one at the image-side surface of the positive lens of the doublet in the second lens group G2, one at the concave surface of the positive meniscus lens in the third lens group G3, and one at the concave surface of the final negative meniscus lens.

EXAMPLE 2

Example 2 is directed to a zoom lens system having a focal length of 39.0 to 152.18 mm and an F-number of 4.73 to 12.88. As shown in FIGS. 2(a) to 2(c) and as is the case with Example 1, the zoom lens system consists of a first lens group G1 having positive refracting power, a second lens group G2 having positive refracting power and a third lens group G3 having negative refracting power. For zooming from the wide-angle end to the telephoto end of the system, the respective lens groups G1 to G3 move toward the object side of the system while the separation between the first lens group G1 and the second lens, group G2 becomes wide and the separation between the second lens group G2 and the third lens group G3 becomes narrow.

The first lens group G1 consists of a doublet made up of a double-convex lens and a double-concave lens, the second lens group G2 consists of a doublet made up of a double-concave lens and a positive meniscus lens convex on its object side, an aperture stop and a positive meniscus lens concave on its object side, and the third lens group G3 consists of a negative meniscus lens, a positive meniscus lens and a negative meniscus lens, all concave on their object sides. Five aspherical surfaces are used, one at the image-side surface of the positive lens of the doublet in the second lens group G2, one at the image-side surface of the positive meniscus lens concave on its object side in the second lens group G2, and three at the concave surfaces of the three meniscus lenses in the third lens group G3.

EXAMPLE 3

Figure 3A:
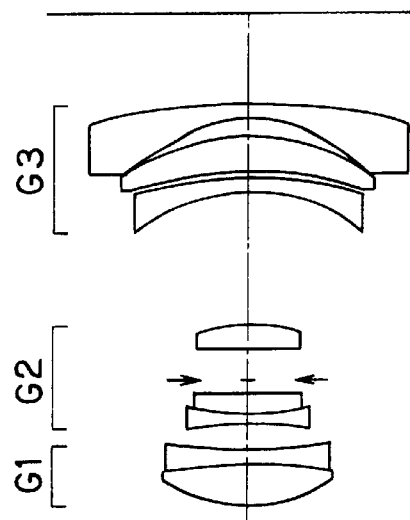
FIGS. 3(a), 3(b) and 3(c) are sectional schematics of the lens arrangement of Example 3 of the zoom lens system according to the present invention at its wide-angle end (a), its intermediate settings (b) and its telephoto end (c), respectively.
Figure 3B:
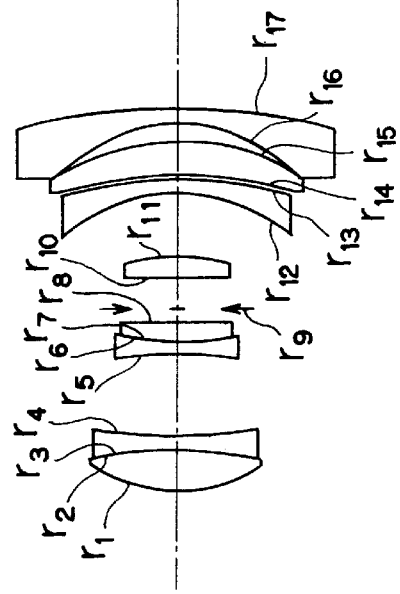
Figure 3C:
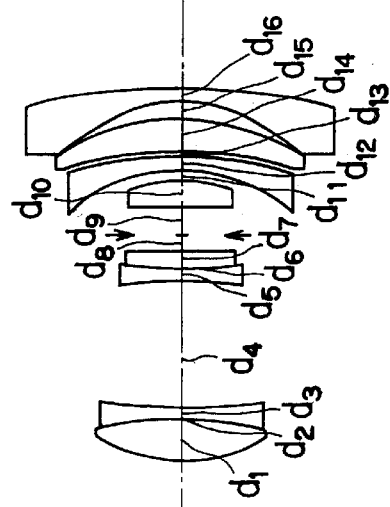

Example 3 is directed to a zoom lens system having a focal length of 39.3 to 151.4 mm and an F-number of 4.58 to 12.91. As shown in FIGS. 3(a) to 3(c), this example is the same as Example 1 in terms of group construction and group movement. The zoom lens system consists of a first lens group G1 having positive refracting power, a second lens group G2 having positive refracting power and a third lens group G3 having negative refracting power. For zooming from the wide-angle end to the telephoto end of the system, the respective lens groups G1 to G3 move toward the object side of the system while the separation between the first lens group G1 and the second lens group G2 becomes wide and the separation between the second lens group G2 and the third lens group G3 becomes narrow.

The first lens group G1 consists of a double-convex lens and a double-concave lens, the second lens group G2 consists of a double-convex lens, a double-convex lens, an aperture stop and a double-convex lens, and the third lens group G3 consists of a negative meniscus lens, a positive meniscus lens and a negative meniscus lens, all concave on their object sides. Three aspherical surfaces are used, one at the image-side surface of the double-convex lens located on the object side with respect to the aperture stop in the second lens group G2, one at the concave surface of the positive meniscus lens in the third lens group G3, and one at the concave surface of the final negative meniscus lens.

EXAMPLE 4

Figures 4A, 4B, 4C:
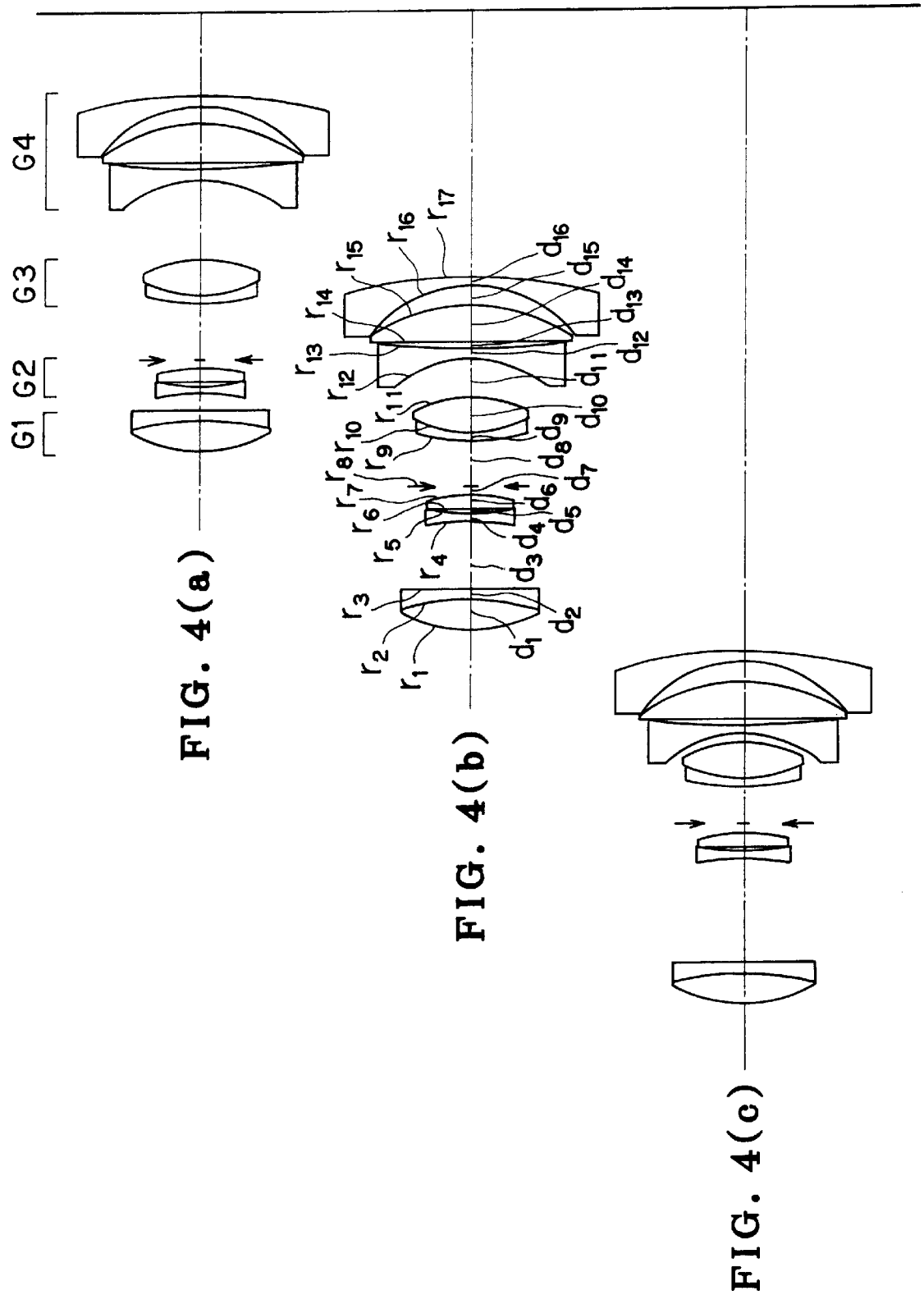
FIGS. 4(a), 4(b) and 4(c) are sectional schematics of the lens arrangement of Example 4 of the zoom lens system according to the present invention at its wide-angle end (a), its intermediate settings (b) and its telephoto end(c), respectively.

Example 4 is directed to a zoom lens system having a focal length of 39.2 to 151.0 mm and an F-number of 4.76 to 12.82. As shown in FIGS. 4(a) to 4(c), the zoom lens system consists of a first lens group G1 having positive refracting power, a second lens group G2 having negative refracting power, a third lens group G3 having positive refracting power and a fourth lens group G4 having negative refracting power. For zooming from the wide-angle end to the telephoto end of the system, the respective lens groups G1 to G4 move toward the object side of the system while the separation between the first lens group G1 and the second lens group G2 becomes wide and the separations between the second lens group G2 and the third lens group G3 and between the third lens gorup G3 and the fourth lens group G4 become narrow. It is here noted that the first lens group G1 moves together with the fourth lens group G4.

The first lens group G1 consists of a doublet made up of a double-convex lens and a negative meniscus lens concave on its object side, the second lens group G2 consists of a double-concave lens, a positive meniscus lens concave on its object side and an aperture stop, the third lens group G3 consists of a doublet made up of a negative meniscus lens convex on its objet side and a double-convex lens, and the fourth lens group G4 consists of a double-concave lens, a double-convex lens and a negative meniscus lens concave on its object side. Six aspherical surfaces are used, one at the final surface in the first lens group G1, two at the object side-surface of the negative lens and the object side-surface of the positive lens in the second lens group G2, one at the image side-surface of the positive lens in the third lens group G3, and two at the surface located nearest to the object side in the fourth lens group G4 and the image side-surface of the positive lens therein.

EXAMPLE 5

Figures 5A, 5B, 5C:
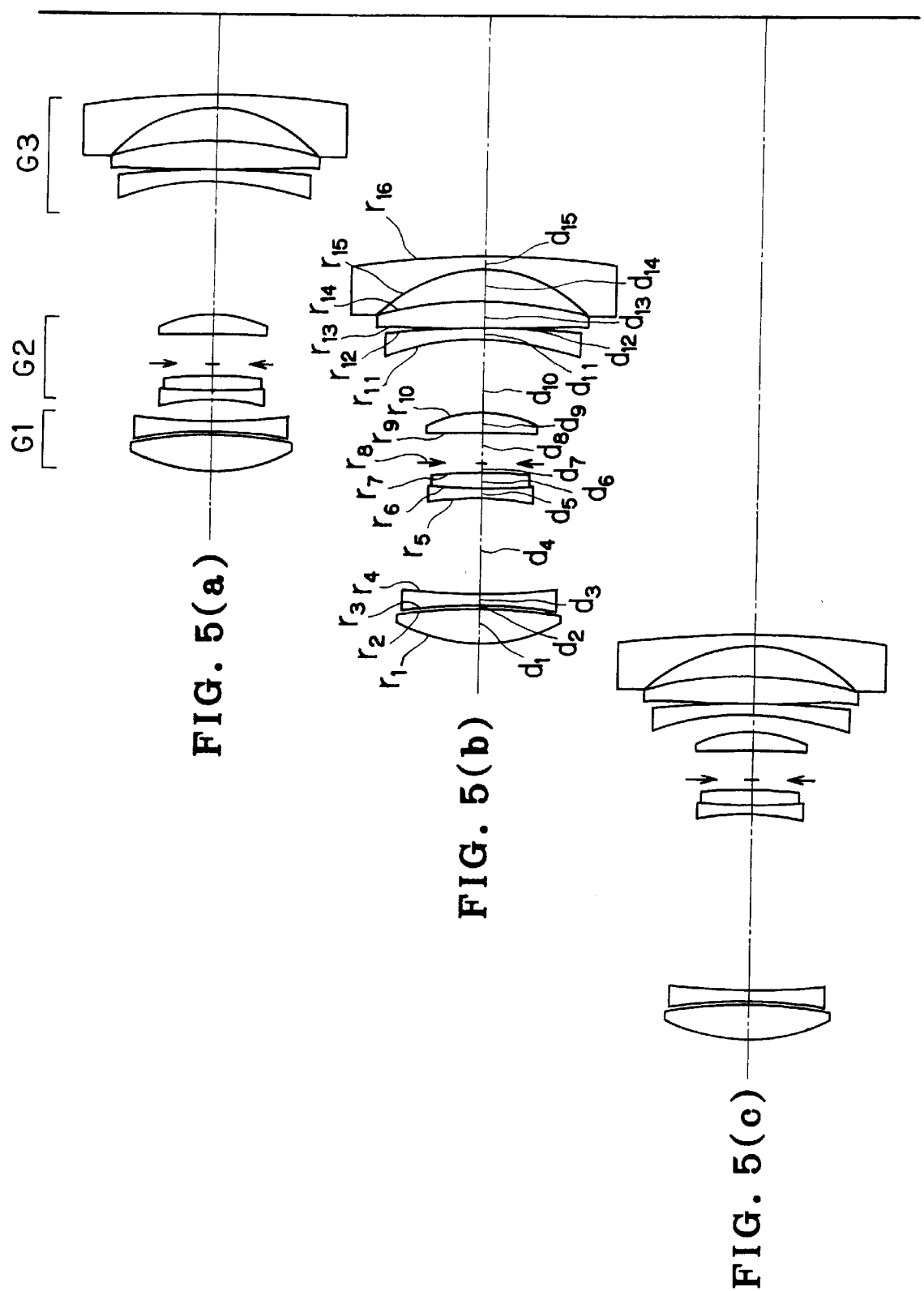
FIGS. 5(a), 5(b) and 5(c) are sectional schematics of the lens arrangement of Example 5 of the zoom lens system according to the present invention at its wide-angle end (a), its intermediate settings (b) and its telephoto end(c), respectively.

Example 5 is directed to a zoom lens system having a focal length of 39.3 to 150.5 mm and an F-number of 4.99 to 13.05. As shown in FIGS. 5(a) to 5(c), the zoom lens system consists of a first lens group G1 having positive refracting power, a second lens group G2 having positive refracting power and a third lens group G3 having negative refracting power. For zooming from the wide-angle end to the telephoto end of the system, the respective lens groups G1 to G3 move independently toward the object side of the system while the separation between the first lens group G1 and the second lens group G2 becomes wide and the separation between the second lens group G2 and the third lens group G3 becomes narrow.

The first lens group G1 consists of a double-convex lens and a double-concave lens, the second lens group G2 consists of a doublet made up of a double-concave lens and a double-convex lens, an aperture stop and a positive meniscus lens concave on its object side, and the third lens group G3 consists of a negative meniscus lens, a positive meniscus lens and a negative meniscus lens, all concave on their objet sides. Three aspherical surfaces are used, one at the image side-surface of the positive lens of the doublet in the second lens group G2, one at the concave surface of the positive meniscus lens in the third lens group G3, and one at the concave surface of the final negative meniscus lens.

EXAMPLE 6

Example 6 is directed to a zoom lens system having a focal length of 39.3 to 154.3 mm and an F-number of 4.65 to 12.85. As shown in FIGS.6(a) to 6(c), the zoom lens system consists of a first lens group G1 having positive refracting power, a second lens group G2 having positive refracting power and a third lens group G3 having negative refracting power. For zooming from the wide-angle end to the telephoto end of the system, the respective lens groups G1 to G3 move independently toward the object side of the system while the separation between the first lens group G1 and the second lens group G2 becomes wide and the separation between the second lens group G2 and the third lens group G3 becomes narrow.

The first lens group G1 consists of a double-convex lens and a double-concave lens, the second lens group G2 consists of a double-concave lens, two double-convex lenses and an aperture stop, and the third lens group G3 consists of a negative meniscus lens, a positive meniscus lens and a negative meniscus lens, all concave on their objet sides. Three aspherical surfaces are used, one at the image side-surface of the first double-convex lens in the second group G2, one at the concave surface of the positive meniscus lens in the third lens group G3, and one at the concave surface of the final negative meniscus lens.

EXAMPLE 7

Figures 7A, 7B, 7C:
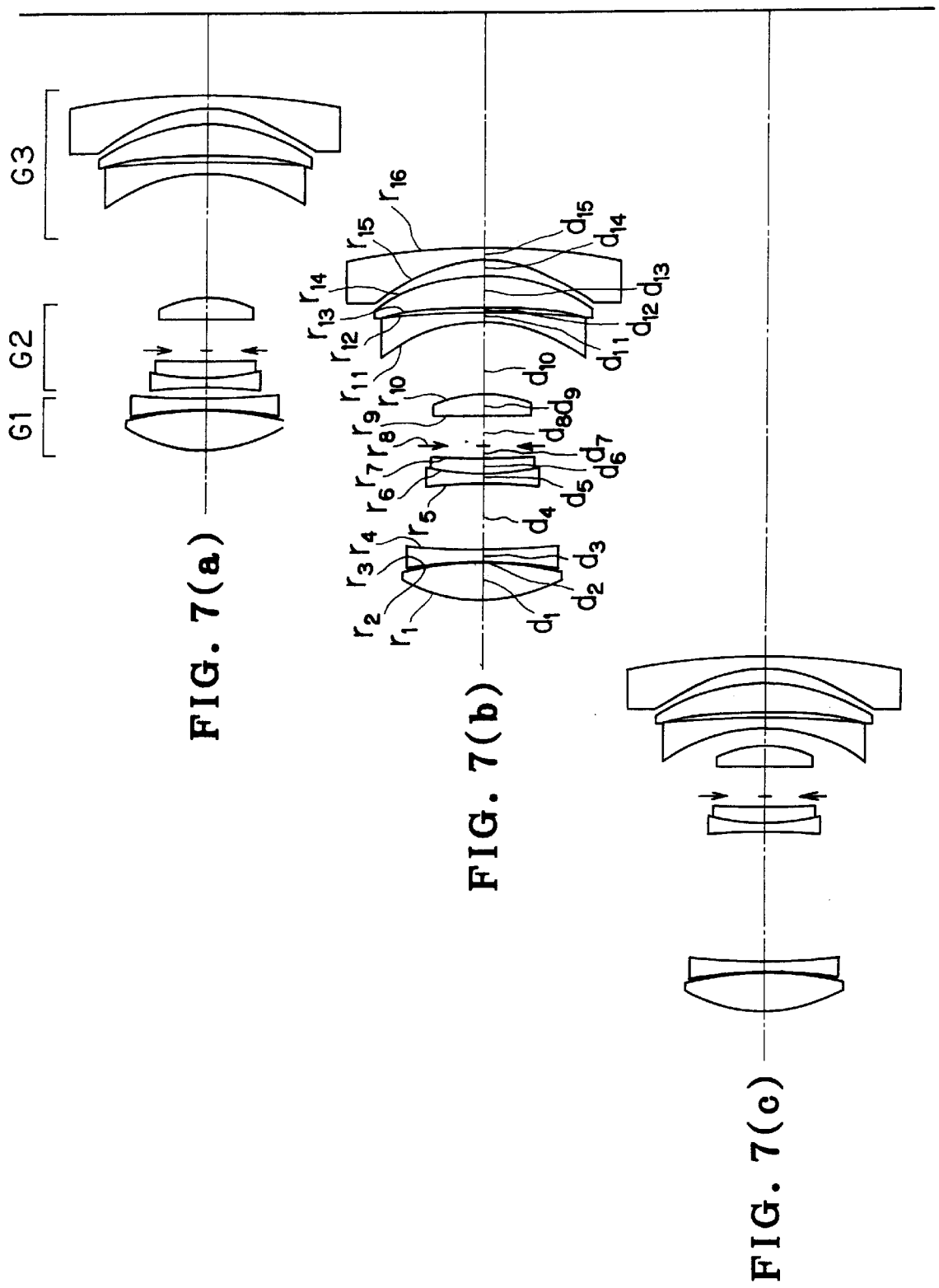
FIGS. 7(a), 7(b) and 7(c) are sectional schematics of the lens arrangement of Example 7 of the zoom lens system according to the present invention at its wide-angle end (a), its intermediate settings (b) and its telephoto end(c), respectively.
Figure 8A:
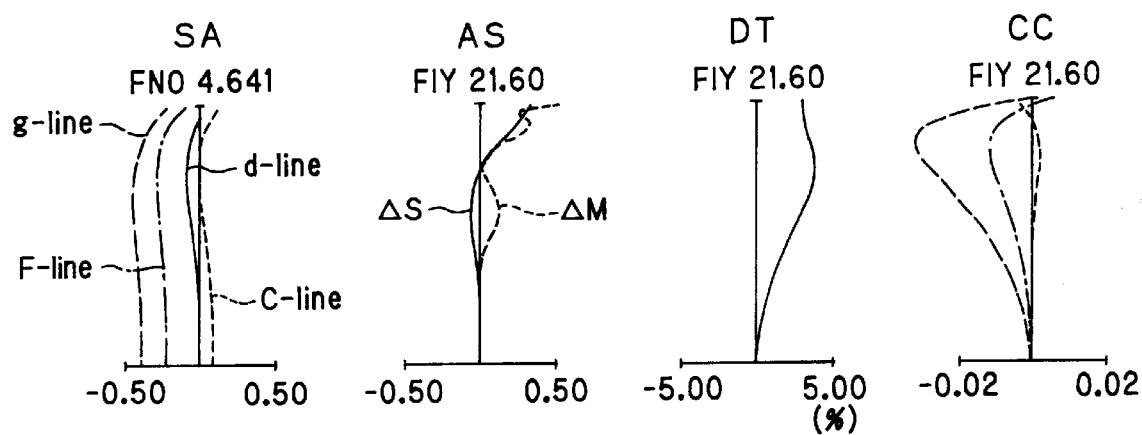
FIGS. 8(a), 8(b) and 8(c) are aberration diagrams for Example 1 upon focused at infinity.
Figure 8B:
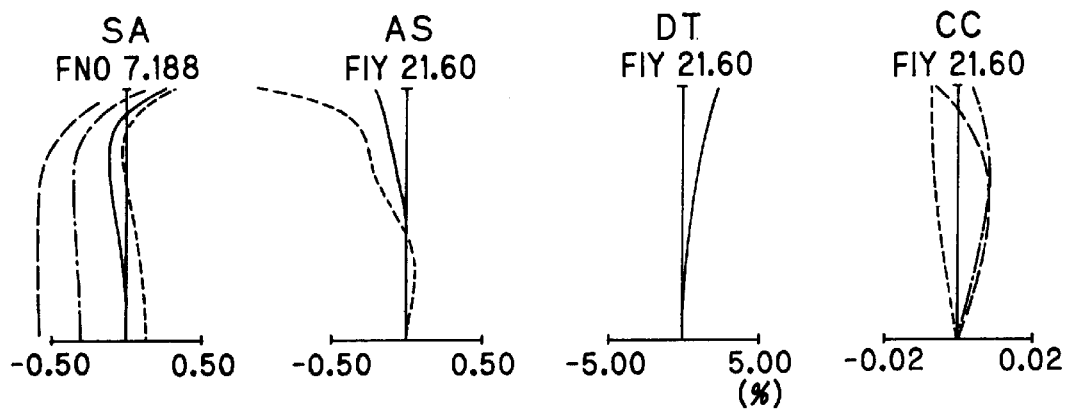
Figure 8C:
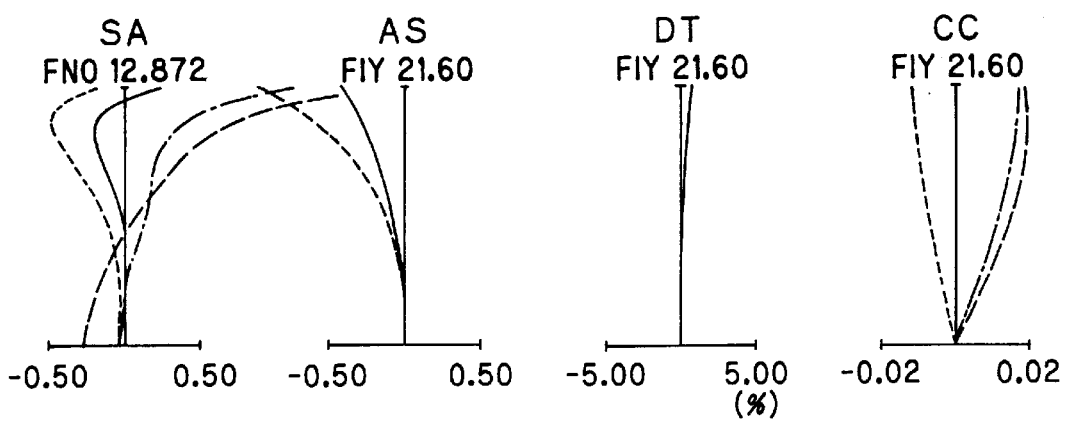
Figure 9A:
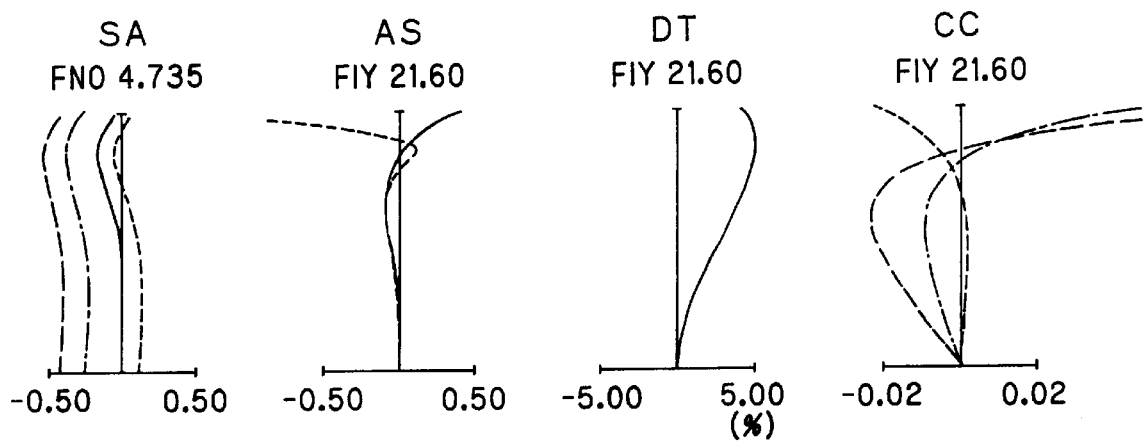
FIGS. 9(a), 9(b) and 9(c) are aberration diagrams for Example 2 upon focused at infinity.
Figure 9B:
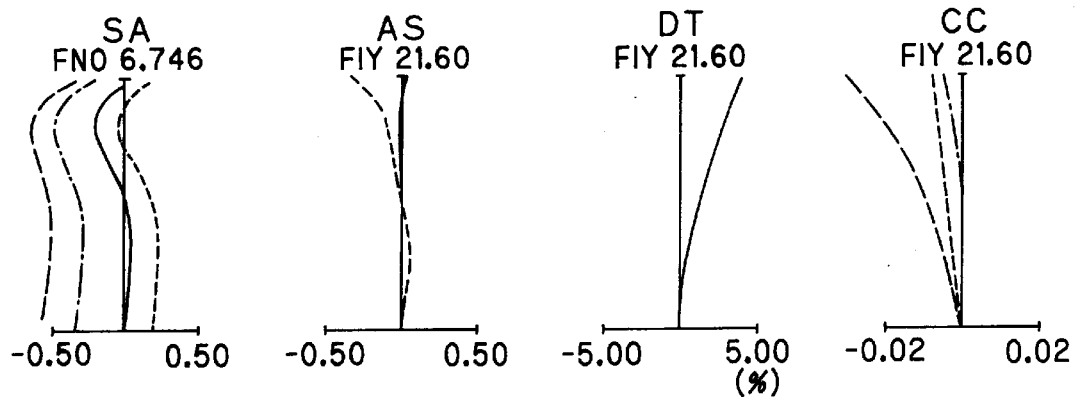
Figure 9C:
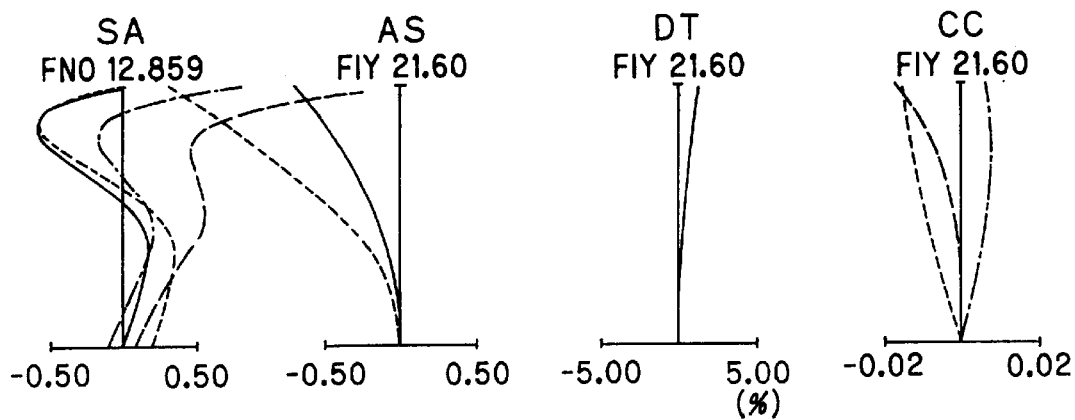
Figure 10A:
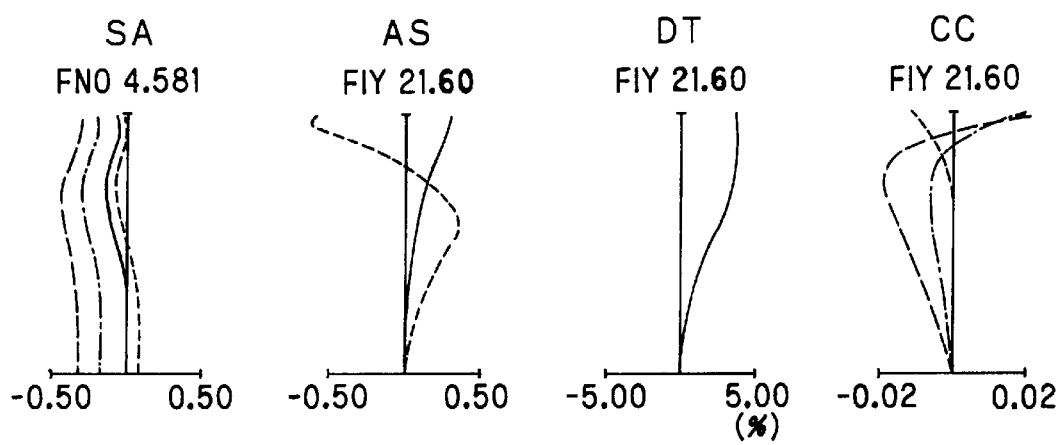
FIGS. 10(a), 10(b) and 10(c) are aberration diagrams for Example 2 upon focused at infinity.
Figure 10B:
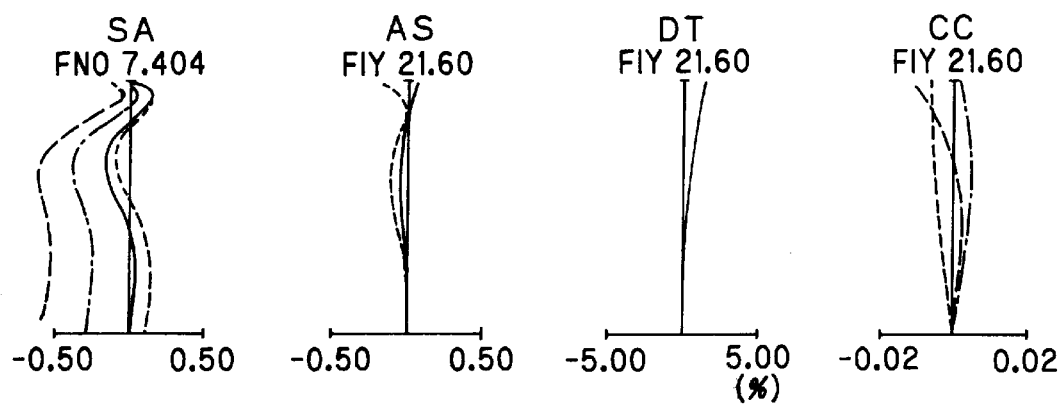
Figure 10C:
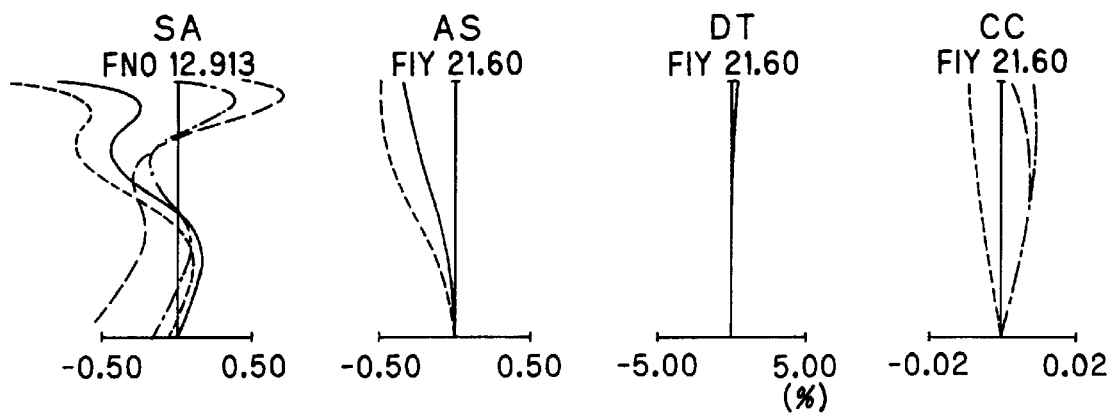
Figure 11A:
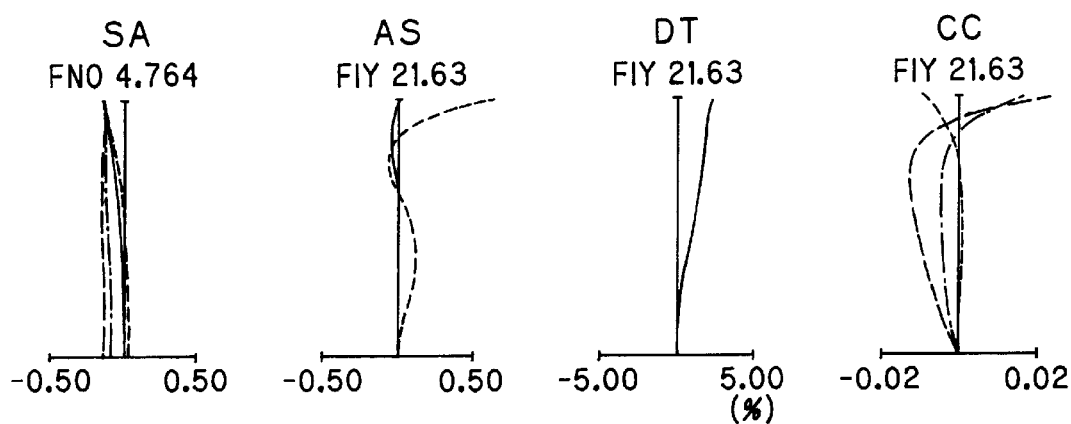
FIGS. 11(a), 11(b) and 11(c) are aberration diagrams for Example 4 upon focused at infinity.
Figure 11B:
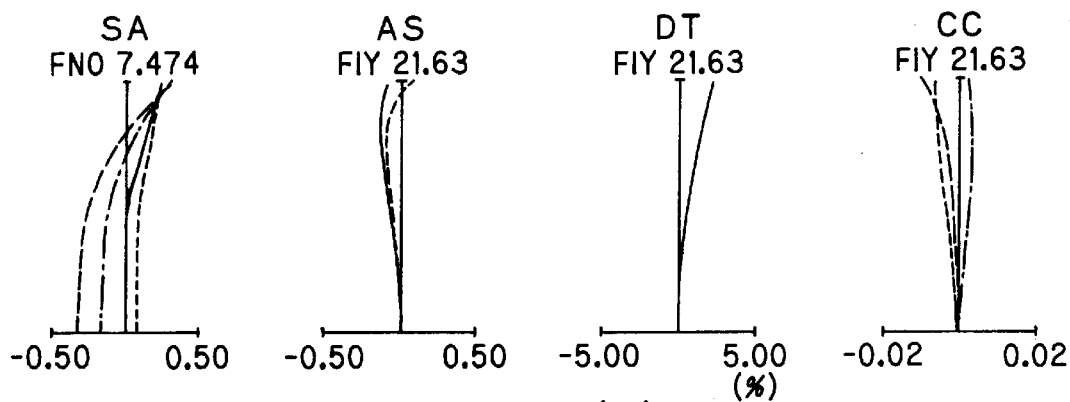
Figure 11C:
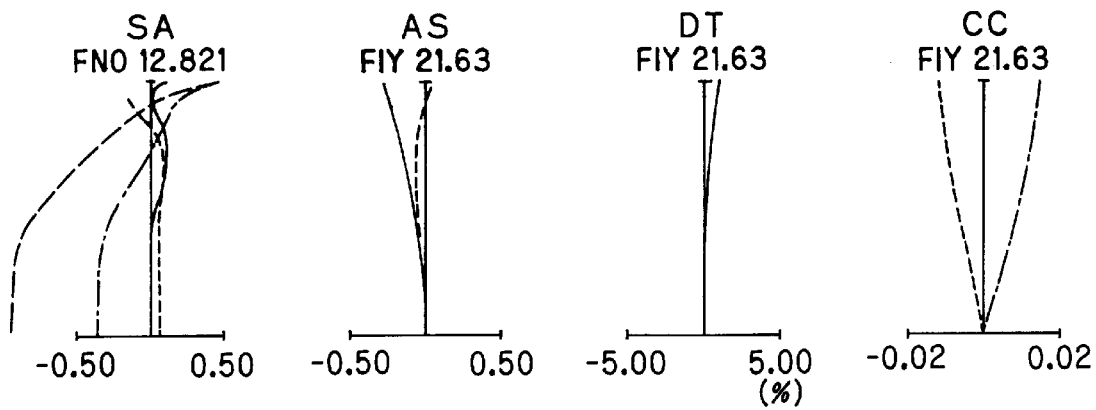
Figure 12A:
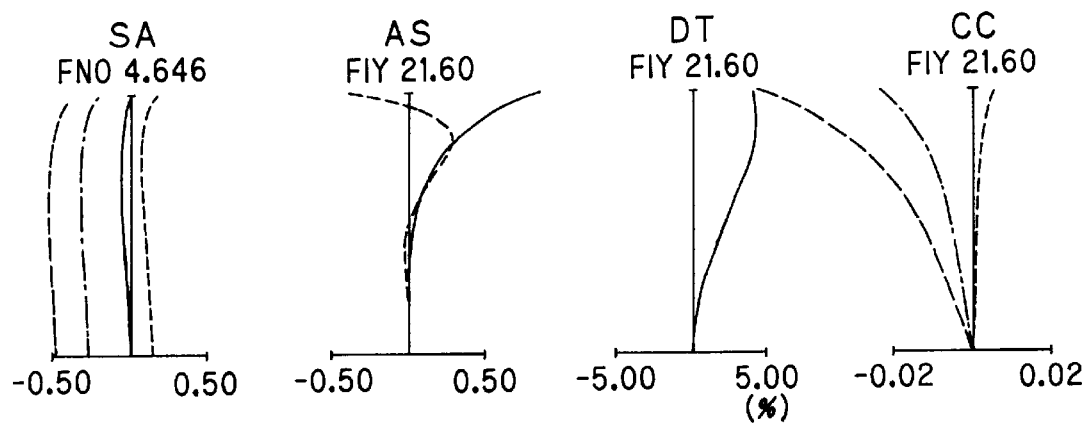
FIGS. 12(a), 12(b) and 12(c) are aberration diagrams for Example 5 upon focused at infinity.
Figure 12B:
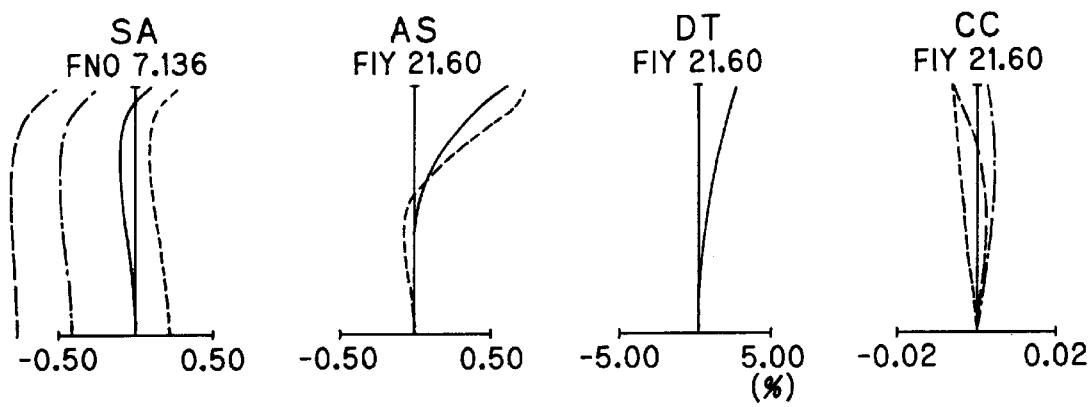
Figure 12C:
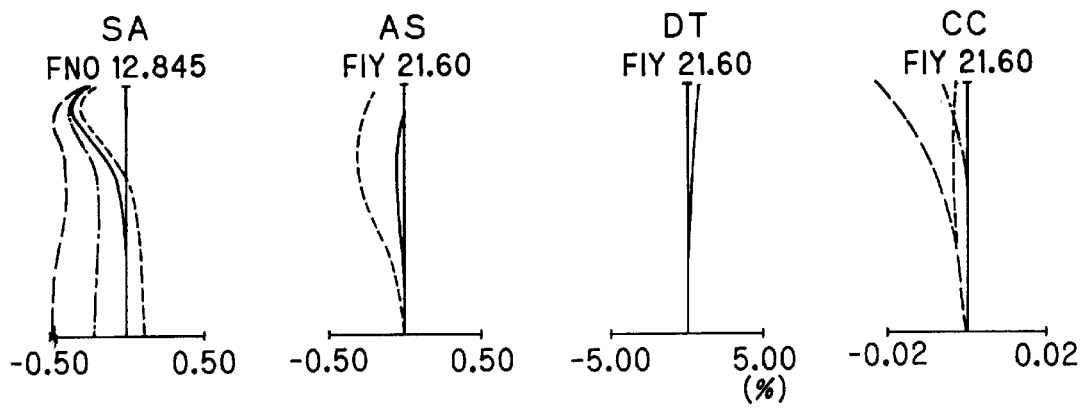
Figure 13A:
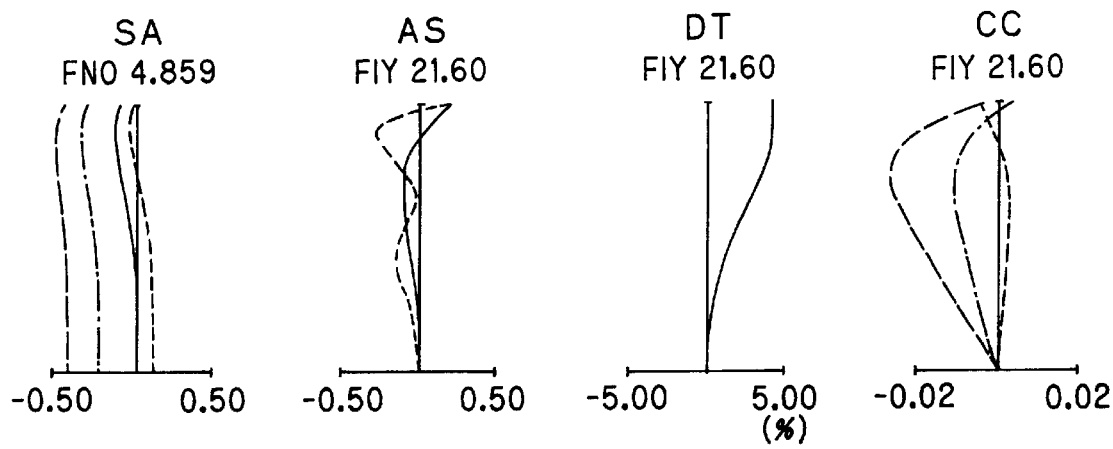
FIGS. 13(a), 13(b) and 13(c) are aberration diagrams for Example 6 upon focused at infinity.
Figure 13B:
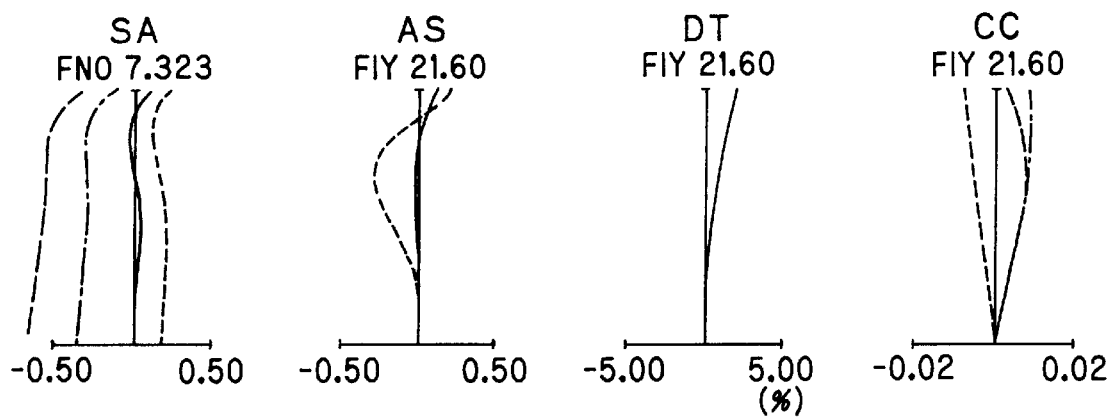
Figure 13C:
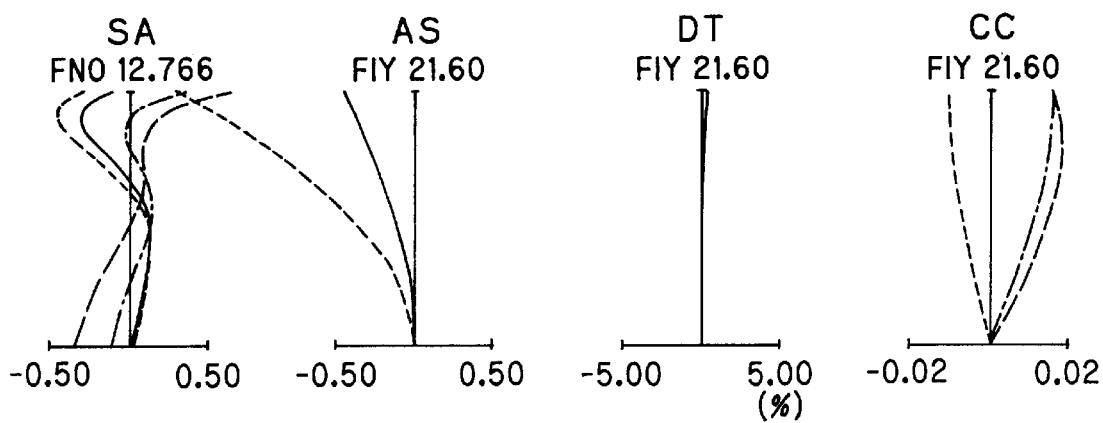
Figure 14A:
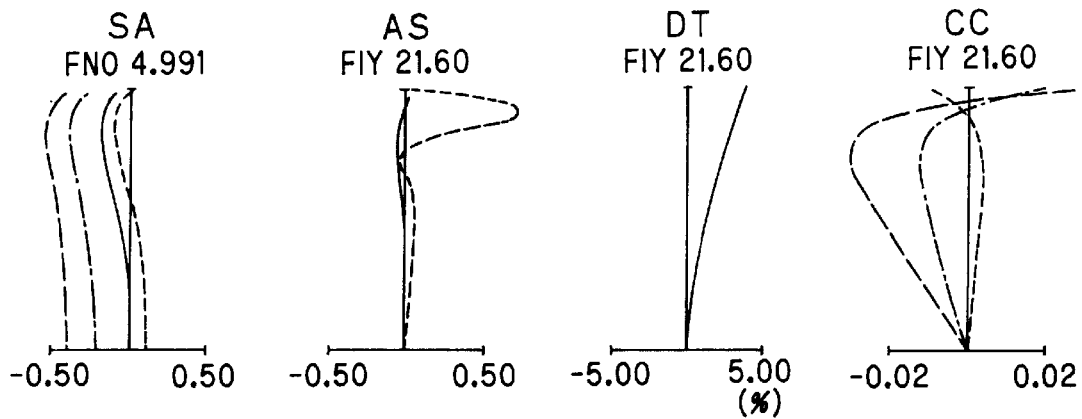
FIGS. 14(a), 14(b) and 14(c) are aberration diagrams for Example 7 upon focused at infinity.
Figure 14B:
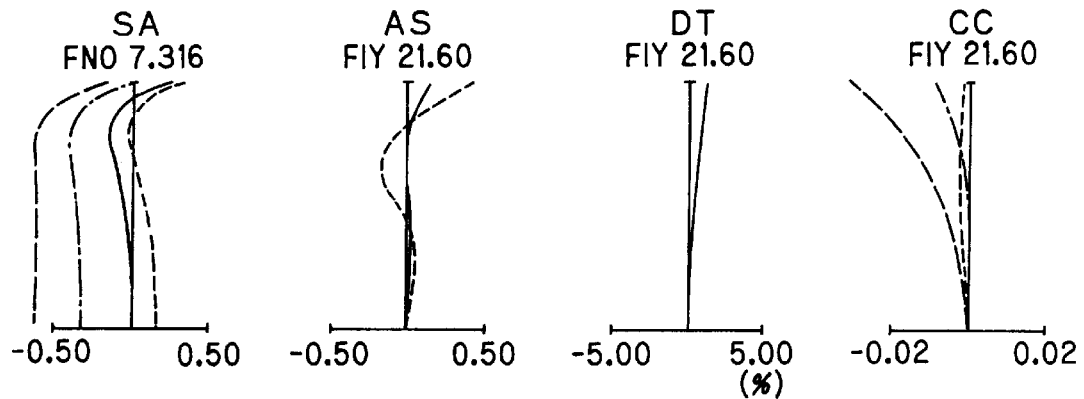
Figure 14C:
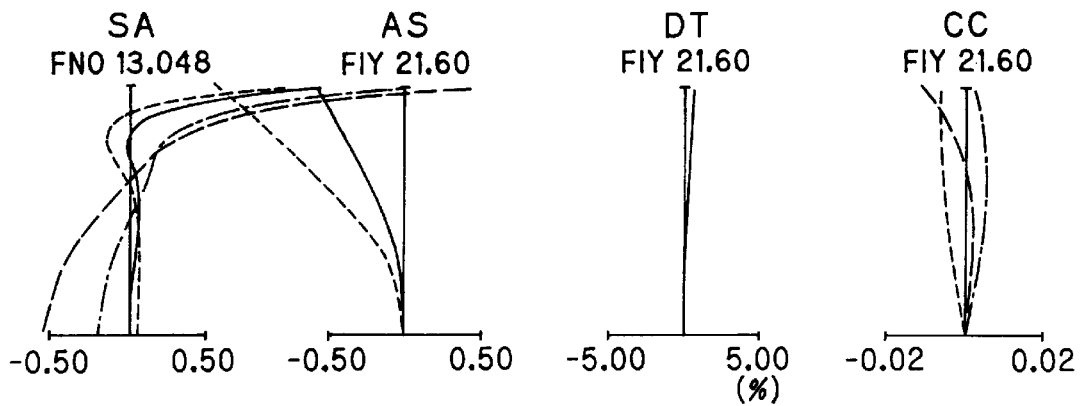

Example 7 is directed to a zoom lens system having a focal length of 39.3 to 150.5 mm and an F-number of 4.99 to 13.05. As shown in FIGS. 7(a) to 7(c), the zoom lens system consists of a first lens group G1 having positive refracting power, a second lens group G2 having positive refracting power and a third lens group G3 having negative refracting power. For zooming from the wide-angle end to the telephoto end of the system, the respective lens groups G1 to G3 move independently toward the object side of the system while the separation between the first lens group G1 and the second lens group G2 becomes wide and the separation between the second lens group G2 and the third lens group G3 becomes narrow.

The first lens group G1 consists of a double-convex lens and a double-concave lens, the second lens group G2 consists of a doublet made up of a double-concave lens and a double-convex lens, an aperture stop and a positive meniscus lens concave on its object side, and the third lens group G3 consists of a negative meniscus lens, a positive meniscus lens and a negative meniscus lens, all concave on their object sides. Three aspherical surfaces are used, one at the image side-surface of the positive lens in the second lens group G2, one at the concave, surface of the positive meniscus lens in the third lens group G3, and one at the concave surface of the final negative meniscus lens. It is here noted that the aspherical surface used with the final negative meniscus lens is assumed to be defined by a molded glass lens using a low-melting vitreous material.

The numerical data on each example are now given. Note that the symbols used hereinafter but not hereinbefore have the following meanings:

f: the focal length of the zoom lens system, $F_{NO}$: F-number, $2\omega$: field angle, FB: back focus, WI: wide-angle end, TE: intermediate settings, $r_1, r_2, \ldots$ : the radius of curvature of each lens surface, $d_1, d_2, \ldots$ : the separation between adjacent lenses, $n_{d1}, n_{d2}, \ldots$ : the d-line index of refraction of each lens, and $\nu_{d1}, \nu_{d2}, \ldots$ : the Abbe number of each lens.

Here let x represent an optical axis where the direction of propagation of light is taken as positive, and y represent a direction perpendicular with respect to the optical axis. Then, aspherical configuration is given by $$x=(y^2/r)/[1+\{1-(K+1)(y/r)^2\}^{1/2}]+A_4 y^4+A_6 y^6+A_8 y^8+A_{10} y^{10}$$

Here r is the paraxial radius of curvature, K is the conical coefficient, and $A_4$, $A_6$, $A_8$ and $A_{10}$ are the fourth, sixth, eighth and tenth aspherical coefficients, respectively.

EXAMPLE 1

| | | | |
|---|---|---|---|
| $r_1 = 12.450$ | $d_1 = 3.750$ | $n_{d1} = 1.49700$ | $\nu_{d1} = 81.54$ |
| $r_2 = -33.319$ | $d_2 = 0.100$ | | |
| $r_3 = -36.125$ | $d_3 = 1.150$ | $n_{d2} = 1.77250$ | $\nu_{d2} = 49.60$ |
| $r_4 = 60.478$ | $d_4 = D1$ | | |
| $r_5 = -85.802$ | $d_5 = 1.000$ | $n_{d3} = 1.80610$ | $\nu_{d3} = 40.92$ |
| $r_6 = 28.677$ | $d_6 = 1.500$ | $n_{d4} = 1.68893$ | $\nu_{d4} = 31.07$ |
| $r_7 = -558.450$ (Aspheric) | $d_7 = 1.000$ | | |
| $r_8 = \infty$ (Stop) | $d_8 = 3.000$ | | |
| $r_9 = -131.755$ | $d_9 = 2.070$ | $n_{d5} = 1.48749$ | $\nu_{d5} = 70.23$ |
| $r_{10} = -10.916$ | $d_{10} = D2$ | | |
| $r_{11} = -13.805$ | $d_{11} = 1.000$ | $n_{d6} = 1.78800$ | $\nu_{d5} = 47.37$ |

-continued

| | | | |
|---|---|---|---|
| $r_{12} = -45.382$ | $d_{12} = 0.500$ | | |
| $r_{13} = -34.305$ (Aspheric) | $d_{13} = 2.780$ | $n_{d7} = 1.78472$ | $\nu_{d7} = 25.68$ |
| $r_{14} = -16.161$ | $d_{14} = 1.680$ | | |
| $r_{15} = -10.515$ (Aspheric) | $d_{15} = 1.120$ | $n_{d8} = 1.77250$ | $\nu_{d8} = 49.60$ |
| $r_{16} = -38.200$ | | | |

Aspherical Coefficients
7 th surface
$K=0.0000$
$A_4=1.5378\times10^{-4}$
$A_6=1.2608\times10^{-6}$
$A_8=-5.9040\times10^{-9}$
$A_{10}=1.8940\times10^{-9}$
13 th surface
$K=0.0000$
$A_4=4.2192\times10^{-5}$
$A_6=6.9873\times10^{-7}$
$A_8=-6.6353\times10^{-9}$
$A_{10}32\ -7.5044\times10^{-11}$
15 th surface
$K=0.0000$
$A_4=3.7256\times10^{-5}$
$A_6=1.0835\times10^{-6}$
$A_8=-3.4821\times10^{-8}$
$A_{10}=4.3340\times10^{-10}$
Zooming Data

| | WI | ST | TE |
|---|---|---|---|
| f (mm) | 39.301 | 71.950 | 151.770 |
| $F_{NO}$ | 4.641 | 7.188 | 12.872 |
| $2\omega$ (°) | 56.2 | 32.7 | 16.1 |
| FB (mm) | 7.120 | 23.969 | 63.861 |
| D1 | 1.819 | 6.834 | 10.790 |
| D2 | 9.771 | 4.758 | 0.800 |

EXAMPLE 2

| | | | |
|---|---|---|---|
| $r_1 = 14.177$ | $d_1 = 3.350$ | $n_{d1} = 1.51633$ | $\nu_{d1} = 64.14$ |
| $r_2 = -101.393$ | $d_2 = 1.000$ | $n_{d2} = 1.74077$ | $\nu_{d2} = 27.79$ |
| $r_3 = 69.734$ | $d_3 = D1$ | | |
| $r_4 = -75.376$ | $d_4 = 1.000$ | $n_{d3} = 1.80100$ | $\nu_{d3} = 34.97$ |
| $r_5 = 6.331$ | $d_5 = 2.000$ | $n_{d4} = 1.69895$ | $\nu_{d4} = 30.13$ |
| $r_6 = 241.290$ (Aspheric) | $d_6 = 1.000$ | | |
| $r_7 = \infty$ (Stop) | $d_7 = 3.000$ | | |
| $r_8 = -290.082$ | $d_8 = 1.780$ | $n_{d5} = 1.48749$ | $\nu_{d5} = 70.23$ |
| $r_9 = -9.025$ (Aspheric) | $d_9 = D2$ | | |
| $r_{10} = -22.366$ (Aspheric) | $d_{10} = 0.981$ | $n_{d6} = 1.69680$ | $\nu_{d6} = 55.53$ |
| $r_{11} = 1541.997$ | $d_{11} = 0.913$ | | |
| $r_{12} = -76.680$ (Aspheric) | $d_{12} = 2.720$ | $n_{d7} = 1.84666$ | $\nu_{d7} = 23.78$ |
| $r_{13} = -26.947$ | $d_{13} = 2.473$ | | |
| $r_{14} = -10.386$ (Aspheric) | $d_{14} = 1.120$ | $n_{d8} = 1.77250$ | $\nu_{d8} = 49.60$ |
| $r_{15} = -39.172$ | | | |

Aspherical Coefficients
6 th surface
$K=0.0000$
$A_4=2.1023\times10^{-4}$
$A_6=1.5620\times10^{-6}$
$A_8=1.3219\times10^{-7}$
$A_{10}=7.4890\times10^{-10}$
9 th surface
$K=0.0000$
$A_4=-1.1209\times10^{-5}$
$A_6=-4.0393\times10^{-6}$
$A_8=1.6067\times10^{-7}$
$A_{10}=-3.8731\times10^{-9}$
10 th surface
$K=0.0000$
$A_4=3.3143\times10^{-5}$
$A_6=-4.0290\times10^{-7}$
$A_8=2.9193\times10^{-8}$
$A_{10}=-5.1135\times10^{-10}$
12 th surface
$K=0.0000$
$A_4=3.1433\times10^{-6}$
$A_6=8.9492\times10^{-8}$
$A_8=-1.2570\times10^{-8}$
$A_{10}=1.0376\times10^{-11}$
14 th surface
$K=0.0000$
$A_4=4.2689\times10^{-5}$
$A_6=9.4049\times10^{-7}$
$A_8=-1.3727\times10^{-8}$
$A_{10}=3.1320\times10^{-10}$
Zooming Data

| | WI | ST | TE |
|---|---|---|---|
| f (mm) | 39.043 | 64.883 | 152.144 |
| $F_{NO}$ | 4.735 | 6.746 | 12.859 |
| $2\omega$ (°) | 56.1 | 35.6 | 16.0 |
| FB (mm) | 7.580 | 20.576 | 62.398 |
| D1 | 1.990 | 6.483 | 11.526 |
| D2 | 10.344 | 5.862 | 0.799 |

EXAMPLE 3

| | | | |
|---|---|---|---|
| $r_1 = 11.733$ | $d_1 = 3.350$ | $n_{d1} = 1.49700$ | $\nu_{d1} = 81.54$ |
| $r_2 = -33.280$ | $d_2 = 0.100$ | | |
| $r_3 = -35.980$ | $d_3 = 1.150$ | $n_{d2} = 1.77250$ | $\nu_{d2} = 49.60$ |
| $r_4 = 59.514$ | $d_4 = D1$ | | |
| $r_5 = -34.690$ | $d_5 = 1.000$ | $n_{d3} = 1.80610$ | $\nu_{d3} = 40.92$ |
| $r_6 = 32.528$ | $d_6 = 0.100$ | | |
| $r_7 = 30.064$ | $d_7 = 1.500$ | $n_{d4} = 1.68893$ | $\nu_{d4} = 31.07$ |
| $r_8 = -83.165$ (Aspheric) | $d_8 = 1.000$ | | |
| $r_9 = \infty$ (Stop) | $d_9 = 2.395$ | | |
| $r_{10} = 128.061$ | $d_{10} = 2.090$ | $n_{d5} = 1.49700$ | $\nu_{d5} = 81.54$ |
| $r_{11} = -13.458$ | $d_{11} = D2$ | | |
| $r_{12} = -13.622$ | $d_{12} = 1.000$ | $n_{d6} = 1.77250$ | $\nu_{d6} = 49.60$ |
| $r_{13} = -38.242$ | $d_{13} = 0.468$ | | |
| $r_{14} = -38.789$ (Aspheric) | $d_{14} = 2.788$ | $n_{d7} = 1.78472$ | $\nu_{d7} = 25.68$ |
| $r_{15} = -17.141$ | $d_{15} = 1.400$ | | |
| $r_{16} = -10.808$ (Aspheric) | $d_{16} = 1.100$ | $n_{d8} = 1.72916$ | $\nu_{d8} = 54.68$ |
| $r_{17} = -52.968$ | | | |

Aspherical Coefficients
8 th surface
$K=0.0000$
$A_4=1.2163\times10^{-4}$
$A_6=-3.8170\times10^{-6}$
$A_8=4.6157\times10^{-7}$
$A_{10}=-1.4655\times10^{-8}$ 14 th surface
K=0.0000
$A_4=-3.3546\times10^{-6}$
$A_6=2.1515\times10^{-7}$
$A_8=-2.4505\times10^{-12}$
$A_{10}=-8.0695\times10^{-11}$
16 th surface
K=0.0000
$A_4=8.2952\times10^{-5}$
$A_6=7.6254\times10^{-7}$
$A_8=-1.6051\times10^{-8}$
$A_{10}=2.3594\times10^{-10}$ Zooming Data

|  | WI | ST | TE |
|---|---|---|---|
| f (mm) | 39.322 | 75.659 | 151.378 |
| $F_{NO}$ | 4.581 | 7.404 | 12.913 |
| 2ω (°) | 55.9 | 31.4 | 16.2 |
| FB (mm) | 7.234 | 26.918 | 66.005 |
| D1 | 1.866 | 6.430 | 10.050 |
| D2 | 10.544 | 4.842 | 0.860 |

EXAMPLE 4

| | | | |
|---|---|---|---|
| $r_1 = 13.776$ | $d_1 = 3.100$ | $n_{d1} = 1.49700$ | $v_{d1} = 81.54$ |
| $r_2 = -25.335$ | $d_2 = 1.000$ | $n_{d2} = 1.77250$ | $v_{d2} = 49.60$ |
| $r_3 = -583.005$ (Aspheric) | $d_3 = D1$ | | |
| $r_4 = -35.946$ (Aspheric) | $d_4 = 0.830$ | $n_{d3} = 1.78800$ | $v_{d3} = 47.37$ |
| $r_5 = 27.785$ | $d_5 = 0.450$ | | |
| $r_6 = -174.873$ (Aspheric) | $d_6 = 1.280$ | $n_{d4} = 1.75520$ | $v_{d4} = 27.51$ |
| $r_7 = -20.420$ | $d_7 = 0.800$ | | |
| $r_8 = \infty$ (Stop) | $d_8 = D2$ | | |
| $r_9 = 22.995$ | $d_9 = 0.712$ | $n_{d5} = 1.80518$ | $v_{d5} = 25.42$ |
| $r_{10} = 12.202$ | $d_{10} = 3.740$ | $n_{d6} = 1.48749$ | $v_{d6} = 70.23$ |
| $r_{11} = -11.560$ (Aspheric) | $d_{11} = D3$ | | |
| $r_{12} = -9.727$ (Aspheric) | $d_{12} = 0.800$ | $n_{d7} = 1.78800$ | $v_{d7} = 47.37$ |
| $r_{13} = 125.767$ | $d_{13} = 0.550$ | | |
| $r_{14} = 1400.966$ | $d_{14} = 3.650$ | $n_{d8} = 1.84666$ | $v_{d8} = 23.78$ |
| $r_{15} = -18.097$ (Aspheric) | $d_{15} = 1.941$ | | |
| $r_{16} = -12.986$ | $d_{16} = 0.800$ | $n_{d9} = 1.74320$ | $v_{d9} = 49.34$ |
| $r_{17} = -51.694$ | | | |

Aspherical Coefficients
3 rd surface
K=0.0000
$A_4=-8.9528\times10^{-6}$
$A_6=-5.5490\times10^{-8}$
$A_8=4.4330\times10^{-10}$
$A_{10}=-4.3855\times10^{-12}$
4 th surface
K=0.0000
$A_4=-7.0283\times10^{-5}$
$A_6=-1.6612\times10^{-6}$
$A_8=3.3048\times10^{-7}$
$A_{10}=-9.3189\times10^{-9}$
6 th surface
K=0.0000
$A_4=-9.6189\times10^{-7}$
$A_6=1.0425\times10^{-6}$
$A_8=-3.3554\times10^{-7}$
$A_{10}=9.4266\times10^{-9}$ 11 th surface
K=0.0000
$A_4=6.7767\times10^{-5}$
$A_6=-1.4835\times10^{-6}$
$A_8=2.6595\times10^{-8}$
$A_{10}=-1.6932\times10^{-10}$
12 th surface
K=0.0000
$A_4=2.2419\times10^{-4}$
$A_6=-6.6874\times10^{-7}$
$A_8=1.2478\times10^{-8}$
$A_{10}=1.4553\times10^{-10}$
15 th surface
K=0.0000
$A_4=1.8839\times10^{-5}$
$A_6=-3.9415\times10^{-7}$
$A_8=2.6966\times10^{-11}$
$A_{10}=8.1863\times10^{-12}$ Zooming Data

|  | WI | ST | TE |
|---|---|---|---|
| f (mm) | 39.153 | 75.004 | 153.049 |
| $F_{NO}$ | 4.764 | 7.474 | 12.821 |
| 2ω (°) | 56.8 | 31.5 | 15.9 |
| FB (mm) | 7.973 | 25.427 | 61.928 |
| D1 | 1.455 | 6.390 | 10.054 |
| D2 | 5.415 | 4.401 | 3.616 |
| D3 | 7.669 | 3.749 | 0.870 |

EXAMPLE 5

| | | | |
|---|---|---|---|
| $r_1 = 16.401$ | $d_1 = 3.750$ | $n_{d1} = 1.49700$ | $v_{d1} = 81.54$ |
| $r_2 = -43.684$ | $d_2 = 0.100$ | | |
| $r_3 = -47.586$ | $d_3 = 1.150$ | $n_{d2} = 1.77250$ | $v_{d2} = 49.60$ |
| $r_4 = 73.897$ | $d_4 = D1$ | | |
| $r_5 = -27.378$ | $d_5 = 1.000$ | $n_{d3} = 1.80610$ | $v_{d3} = 40.92$ |
| $r_6 = 143.026$ | $d_6 = 1.500$ | $n_{d4} = 1.68893$ | $v_{d4} = 31.07$ |
| $r_7 = -48.103$ (Aspheric) | $d_7 = 1.000$ | | |
| $r_8 = \infty$ (Stop) | $d_8 = 3.000$ | | |
| $r_9 = -282.131$ | $d_9 = 2.070$ | $n_{d5} = 1.48749$ | $v_{d5} = 70.23$ |
| $r_{10} = -11.325$ | $d_{10} = D2$ | | |
| $r_{11} = -27.436$ | $d_{11} = 1.000$ | $n_{d6} = 1.78800$ | $v_{d6} = 47.37$ |
| $r_{12} = -138.706$ | $d_{12} = 0.100$ | | |
| $r_{13} = 2626.730$ (Aspheric) | $d_{13} = 2.780$ | $n_{d7} = 1.78472$ | $v_{d7} = 25.68$ |
| $r_{14} = -37.978$ | $d_{14} = 3.048$ | | |
| $r_{15} = -12.246$ (Aspheric) | $d_{15} = 1.120$ | $n_{d8} = 1.77250$ | $v_{d8} = 49.60$ |
| $r_{16} = -101.546$ | | | |

Aspherical Coefficients
7 th surface
K=0.0000
$A_4=1.2523\times10^{-4}$
$A_6=7.7225\times10^{-8}$
$A_8=1.8848\times10^{-8}$
$A_{10}=7.1756\times10^{-10}$
13 th surface
K=0.0000
$A_4=1.3151\times10^{-5}$
$A_6=6.6619\times10^{-8}$
$A_8=1.9485\times10^{-9}$
$A_{10}=-3.2093\times10^{-11}$ 15th surface
K=0.0000
$A_4 = 5.9816 \times 10^{-5}$
$A_6 = 5.9791 \times 10^{-7}$
$A_8 = -1.4345 \times 10^{-8}$
$A_{10} = 1.1945 \times 10^{-10}$ Zooming Data

|  | WI | ST | TE |
|---|---|---|---|
| f (mm) | 39.310 | 69.809 | 151.455 |
| $F_{NO}$ | 4.859 | 7.323 | 12.766 |
| 2ω (°) | 55.7 | 33.8 | 16.2 |
| FB (mm) | 7.154 | 22.521 | 59.916 |
| D1 | 2.083 | 9.645 | 17.737 |
| D2 | 12.808 | 7.139 | 1.777 |

EXAMPLE 6

| $r_1 = 18.902$ | $d_1 = 4.756$ | $n_{d1} = 1.49700$ | $v_{d1} = 81.54$ |
|---|---|---|---|
| $r_2 = -61.567$ | $d_2 = 0.100$ | | |
| $r_3 = -74.526$ | $d_3 = 1.150$ | $n_{d2} = 1.80440$ | $v_{d2} = 39.59$ |
| $r_4 = 102.058$ | $d_4 = D1$ | | |
| $r_5 = -18.996$ | $d_5 = 1.000$ | $n_{d3} = 1.79952$ | $v_{d3} = 42.22$ |
| $r_6 = 32.630$ | $d_6 = 0.200$ | | |
| $r_7 = 40.945$ | $d_7 = 1.500$ | $n_{d4} = 1.68893$ | $v_{d4} = 31.07$ |
| $r_8 = -38.149$ (Aspheric) | $d_8 = 3.208$ | | |
| $r_9 = 74.330$ | $d_9 = 2.070$ | $n_{d5} = 1.48749$ | $v_{d5} = 70.23$ |
| $r_{10} = -11.493$ | $d_{10} = 0.500$ | | |
| $r_{11} = \infty$ (Stop) | $d_{11} = D2$ | | |
| $r_{12} = -119.696$ | $d_{12} = 1.000$ | $n_{d6} = 1.77250$ | $v_{d6} = 49.60$ |
| $r_{13} = 246.351$ | $d_{13} = 0.481$ | | |
| $r_{14} = -64.344$ (Aspheric) | $d_{14} = 2.780$ | $n_{d7} = 1.78472$ | $v_{d7} = 25.68$ |
| $r_{15} = -30.758$ | $d_{15} = 3.985$ | | |
| $r_{16} = -10.526$ (Aspheric) | $d_{16} = 1.120$ | $n_{d8} = 1.74100$ | $v_{d8} = 52.64$ |
| $r_{17} = -51.031$ | | | |

Aspherical Coefficients 8 th surface

K=0.0000
$A_4 = 1.0606 \times 10^{-4}$
$A_6 = 1.1505 \times 10^{-6}$
$A_8 = -1.7810 \times 10^{-8}$
$A_{10} = 7.3914 \times 10^{-10}$
14 th surface
K=0.0000
$A_4 = 2.5936 \times 10^{-5}$
$A_6 = 6.1143 \times 10^{-7}$
$A_8 = -6.8854 \times 10^{-9}$
$A_{10} = 5.8080 \times 10^{-11}$
16 th surface
K=0.0000
$A_4 = 4.8128 \times 10^{-5}$
$A_6 = 1.2246 \times 10^{-9}$
$A_8 = 8.1812 \times 10^{-10}$
$A_{10} = 2.2243 \times 10^{-11}$ Zooming Data

|  | WI | ST | TE |
|---|---|---|---|
| f (mm) | 39.308 | 72.583 | 154.332 |
| $F_{NO}$ | 4.646 | 7.136 | 12.845 |
| 2ω (°) | 55.8 | 32.4 | 15.8 |
| FB (mm) | 6.951 | 25.048 | 68.231 |
| D1 | 2.054 | 9.748 | 15.452 |
| D2 | 14.040 | 6.858 | 1.250 |

EXAMPLE 7

| $r_1 = 13.602$ | $d_1 = 3.750$ | $n_{d1} = 1.49700$ | $v_{d1} = 81.54$ |
|---|---|---|---|
| $r_2 = -39.868$ | $d_2 = 0.100$ | | |
| $r_3 = -42.611$ | $d_3 = 1.160$ | $n_{d2} = 1.78800$ | $v_{d2} = 47.37$ |
| $r_4 = 75.616$ | $d_4 = D1$ | | |
| $r_5 = -56.461$ | $d_5 = 1.000$ | $n_{d3} = 1.80610$ | $v_{d3} = 40.92$ |
| $r_6 = 24.450$ | $d_6 = 1.500$ | $n_{d4} = 1.68893$ | $v_{d4} = 31.07$ |
| $r_7 = -1702.697$ (Aspheric) | $d_7 = 1.000$ | | |
| $r_8 = \infty$ (Stop) | $d_8 = 3.000$ | | |
| $r_9 = -1372.401$ | $d_9 = 2.070$ | $n_{d5} = 1.48749$ | $v_{d5} = 70.23$ |
| $r_{10} = -10.712$ | $d_{10} = D2$ | | |
| $r_{11} = -15.222$ | $d_{11} = 1.008$ | $n_{d6} = 1.80300$ | $v_{d6} = 46.66$ |
| $r_{12} = -96.645$ | $d_{12} = 0.406$ | | |
| $r_{13} = -86.666$ (Aspheric) | $d_{13} = 3.038$ | $n_{d7} = 1.76182$ | $v_{d7} = 26.52$ |
| $r_{14} = -17.654$ | $d_{14} = 1.477$ | | |
| $r_{15} = -11.325$ (Aspheric) | $d_{15} = 1.120$ | $n_{d8} = 1.73310$ | $v_{d8} = 49.40$ |
| $r_{16} = -69.466$ | | | |

Aspherical Coefficients
7 th surface
K=0.0000
$A_4 = 1.5428 \times 10^{-4}$
$A_6 = 1.2690 \times 10^{-6}$
$A_8 = -6.7993 \times 10^{-8}$
$A_{10} = 6.1622 \times 10^{-9}$
13 th surface
K=0.0000
$A_4 = -4.1809 \times 10^{-6}$
$A_6 = -6.6968 \times 10^{-7}$
$A_8 = 1.4101 \times 10^{-8}$
$A_{10} = -1.3561 \times 10^{-10}$
15 th surface
K=0.0000
$A_4 = 7.9018 \times 10^{-5}$
$A_6 = 1.5811 \times 10^{-6}$
$A_8 = -2.1235 \times 10^{-8}$
$A_{10} = 1.8645 - 10^{-10}$ Zooming Data

|  | WI | ST | TE |
|---|---|---|---|
| f (mm) | 39.298 | 67.570 | 150.500 |
| $F_{NO}$ | 4.991 | 7.316 | 13.048 |
| 2ω (°) | 55.9 | 35.1 | 16.3 |
| FB (mm) | 7.266 | 21.732 | 61.230 |
| D1 | 1.426 | 6.731 | 12.612 |
| D2 | 11.402 | 6.569 | 1.590 |

Shown in FIGS. 8 through 14 are aberration diagrams for Examples 1 through 7 upon focused at infinity. In these diagrams, (a) stands for aberrations at the wide-angle end, (b) aberrations at the intermediate settings, and (c) aberrations at the telephoto end, and SA, AS, DT, CC and FIY indicating spherical aberrations, astigmatism, distortion, chromatic aberration of magnification and image height, respectively.

Set out below are the values of parameters with respect to conditions (1) through (6) in Examples 1 through 7.

|  | Ex. 1 | Ex. 2 | Ex. 3 | Ex. 4 |
|---|---|---|---|---|
| (1) $L_T/f_T$ | 0.633 | 0.631 | 0.637 | 0.628 |
| (2) $f_1/f_T$ | 0.286 | 0.265 | 0.262 | 0.24 |
| (3) $f_T/f_W$ | 3.862 | 3.897 | 3.85 | 3.909 |
| (4) $|f_3|/f_2$ | 0.476 | 0.475 | 0.44 | — |
| (5) $L_T$ | 96.1 | 96.06 | 96.36 | 96.121 |
| (6) $d/f_W$ | 0.102 | 0.102 | 0.086 | — |
| (7) $(D_{1W} + D_{2W})/(D_{1T} + D_{2T})$ | 1 | 1 | 1.05 | — |

|  | Ex. 5 | Ex. 6 | Ex. 7 |
|---|---|---|---|
| (1) $L_T/f_T$ | 0.667 | 0.703 | 0.638 |
| (2) $f_1/f_T$ | 0.402 | 0.382 | 0.303 |
| (3) $f_T/f_W$ | 3.835 | 3.929 | 3.830 |
| (4) $|f_3|/f_2$ | 0.530 | 0.569 | 0.489 |
| (5) $L_T$ | 101.05 | 108.58 | 96.06 |
| (6) $d/f_W$ | 0.102 | 0.064 | 0.102 |
| (7) $(D_{1W} + D_{2W})/(D_{1T} + D_{2T})$ | 0.763 | 0.927 | 0.903 |

Figure 15:
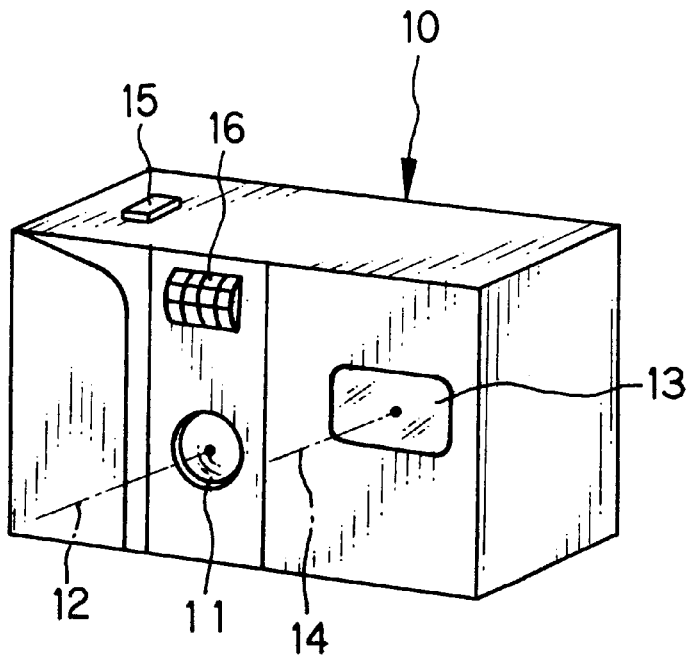
FIG. 15 is a perspective view of the outside shape of a digital camera as taken from its front.
Figure 16:
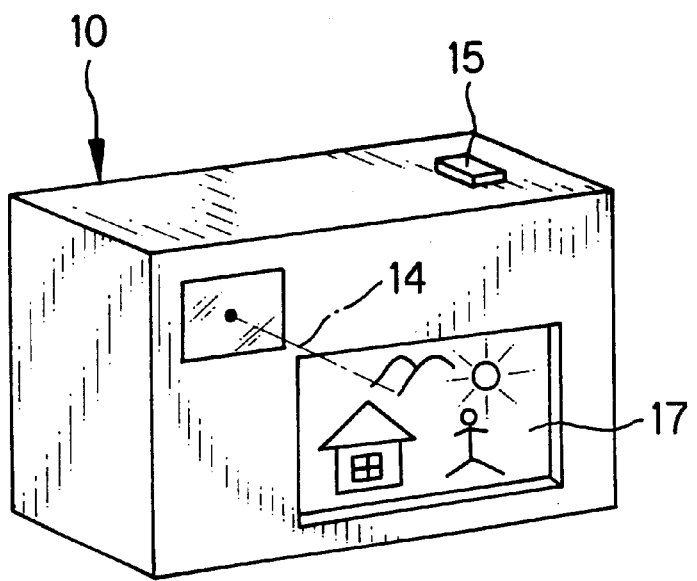
FIG. 16 is a perspective view of the digital camera of FIG. 15, as taken from its rear.
Figure 17:
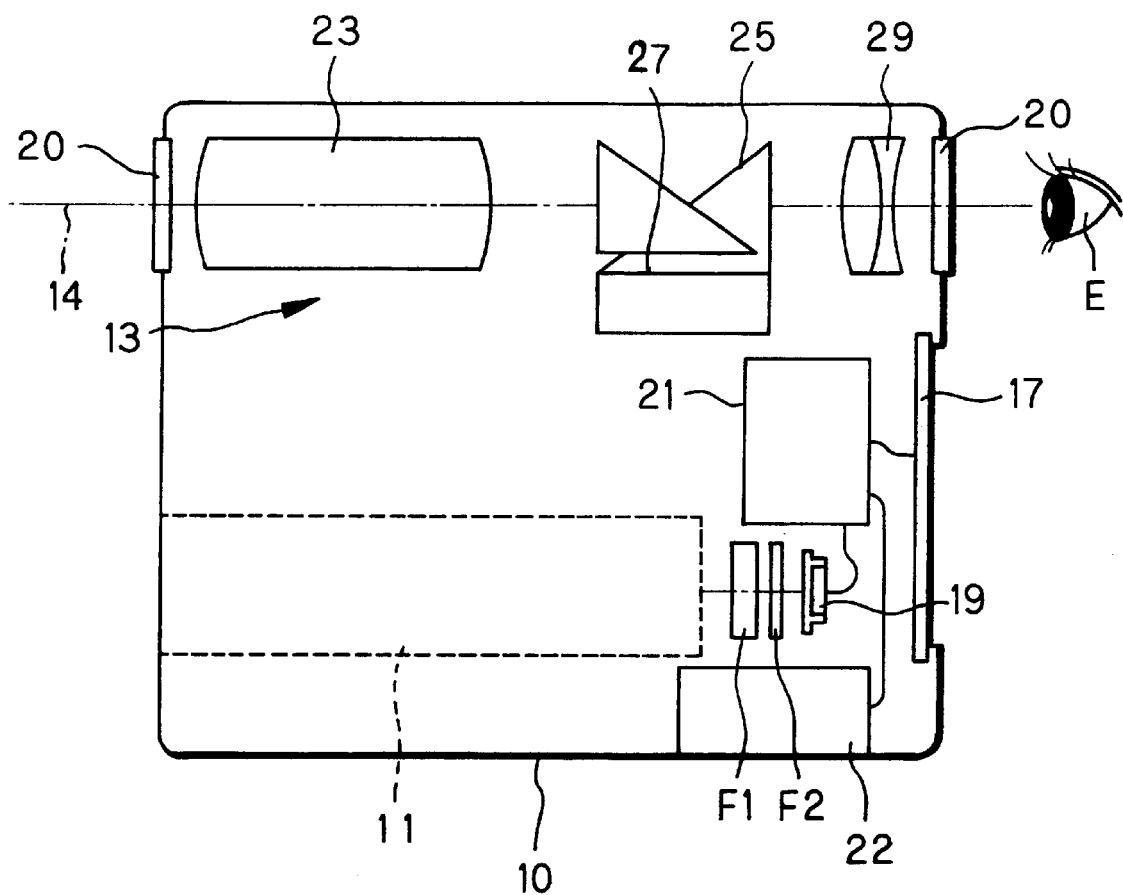
FIG. 17 is a sectional schematic illustrative of the construction of a digital camera.

The zoom lens system according to the present invention may be used as a phototaking optical system for image pickup equipment, etc. FIGS. 15 to 17 are conceptual schematics of a digital camera that is one embodiment of the image pickup system according to the present invention. FIG. 15 is a perspective view illustrative of the outside shape of a digital camera 10 as viewed from its front, and FIG. 16 is a perspective view illustrative of the digital camera 10 as viewed from its rear. FIG. 17 is a sectional view illustrative of the construction of the digital camera 10. The digital camera 10 shown comprises a phototaking optical system 11 including a phototaking optical path 12, a finder optical system 13 including a finder optical path 14, a shutter button 15, a flash 16 and a liquid crystal display monitor 17. Upon pressing down the shutter button 15 located on the upper portion of the camera 10, phototaking occurs through the phototaking optical system 11, for instance, the zoom lens system set forth in Example 1 and shown in FIGS. 1(a) to 1(c).

An object image formed through the phototaking optical system 11 is then formed on,the image pickup plane of an electronic image pickup element (CCD) 19 via filters F1, F2 such as a low-pass filter and an infrared cutoff filter. The object image sensed by this CCD 19 is displayed as an electronic image on the liquid crystal display monitor 17 located on the back side of the camera via processing means 21. This processing means 21 may be connected with recording means 22 for recording the phototaking electronic image. It is here noted that the recording means 22 may be provided separately from the processing means 21 or in the form of electronic read/write means comprising a floppy disk, a memory card or an MO. Instead of CCD 19, a silver salt camera with silver salt film loaded therein may be used.

Further, a finder objective optical system 23 is located on the finder optical path 14. An object image formed by this finder objective optical system 23 is then formed on a field frame 17 of a Porro prism 25 that is an image erecting member. In the rear of the Porro prism 25, there is provided an eyepiece optical system 29 for guiding an erected image to an observer's eyeball E. It is here noted that a cover member 20 is provided on the entrance side of phototaking optical system 11 and finder optical system 23 while a cover member 20 is disposed on the exit side of eyepiece optical system 29.

The thus constructed digital camera 10 can have ever-higher performance at ever-lower costs, because the phototaking optical system 11 used therewith is a compact zoom lens system having an ever-wider angle and an ever-higher zoom ratio with well-corrected aberrations.

As can be understood from the foregoing explanations, the present invention can provide a compact camera-oriented zoom lens system which comprises three or ++− lens groups or four or +−+− lens groups and, albeit having a high zoom ratio, is very compact with well-corrected various aberrations.

What we claim is:

1. A zoom lens comprising, in order from an object side of the system, a positive first lens group, a positive second lens group and a negative third lens group, structured and arranged such that while each lens group moves from an image side of the system to the object side for zooming from a wide-angle end to a telephoto end of the system, the following conditions (1 and 6) are satisfied:

$$L_T/f_T < 0.65 \tag{1}$$

$$0.086 < d/f_W < 0.15 \tag{6}$$

where $L_T$ is a distance at the telephoto end from a front surface of the zoom lens system to an image formation position and $f_T$ is a focal length of the zoom lens system at the telephoto end, d is the distance between a second and a third lens, from the object side, in the second lens group and $f_W$ is the focal length of the zoom lens system at the wide-angle end.

2. The zoom lens system according to claim 1, characterized in that a distance between said first lens group and a final lens group remains invariable during zooming.

3. An image pickup system characterized by comprising an image pickup member and a zoom lens system comprising, in order from an object side of the system, a positive first lens group, a positive second lens group and a negative third lens group, wherein while each lens group moves from an image side of the system to the object side for zooming from a wide-angle end to a telephoto end of the system, the following conditions (1 and 6) are satisfied:

$$L_T/f_T < 0.65 \tag{1}$$

$$0.086 < d/f_W < 0.15 \tag{6}$$

where $L_T$ is a distance at the telephoto end from a front surface of the zoom lens system to an image formation position and $f_T$ is a focal length of the zoom lens system at the telephoto end, d is the distance between a second and a third lens, from the object side, in the second lens group and $f_W$ is the focal length of the zoom lens system at the wide-angle end.

* * * * *